United States Patent
Trim et al.

(10) Patent No.: US 11,017,017 B2
(45) Date of Patent: May 25, 2021

(54) REAL-TIME VISION ASSISTANCE

(71) Applicant: International Business Machines Corporation, Armonk, NY (US)

(72) Inventors: Craig M. Trim, Ventura, CA (US); Lakisha R. S. Hall, Upper Marlboro, MD (US); Gandhi Sivakumar, Bentleigh (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/430,475

(22) Filed: Jun. 4, 2019

(65) Prior Publication Data
US 2020/0387537 A1    Dec. 10, 2020

(51) Int. Cl.
*G06F 16/583*    (2019.01)
*G09B 21/00*    (2006.01)
(Continued)

(52) U.S. Cl.
CPC ......... *G06F 16/5838* (2019.01); *G02C 7/104* (2013.01); *G06F 3/005* (2013.01);
(Continued)

(58) Field of Classification Search
CPC .................... G06F 16/5838; G09B 21/008
See application file for complete search history.

(56) References Cited

U.S. PATENT DOCUMENTS 6,665,642 B2    12/2003 Kanevsky
6,876,369 B2    4/2005 Brown
(Continued)

FOREIGN PATENT DOCUMENTS

CN        105866955 A        8/2016
WO    WO-2010097460 A1 *  9/2010    .......... H04M 1/2476

OTHER PUBLICATIONS

A. Gohil, H. Modi and S. K. Patel, "5G technology of mobile communication: A survey," 2013 International Conference on Intelligent Systems and Signal Processing (ISSP), 2013, pp. 288-292, (Year: 2013).*

(Continued)

*Primary Examiner* — Terrell M Robinson
(74) *Attorney, Agent, or Firm* — Christopher M. Pignato

(57) ABSTRACT

Systems, methods, and computer program products for a cognitive personalized channel on a computer network or telecommunications network, such as a 5G mobile communication network, which can be used for medical purposes to assist color-blind users and people afflicted with achromatopsia. The personalized channel can be a bidirectional channel capable of identifying color and serve as an enhanced medical service. The service operates by collecting collects inputs and streaming data, creates situation-based tags and embeds the tags on human-readable displays to assist users understanding of additional context of the streaming data that might otherwise not be understood due to the user's medical condition. The systems, methods and program products use the embedded tags to create a manifestation of the colors in images, videos, text and other collected visual streams by taking advantage of end-to-end service orchestration provided by 5G networks.

20 Claims, 9 Drawing Sheets

(51) Int. Cl.
  *H04N 1/60* (2006.01)
  *G06F 3/00* (2006.01)
  *G02C 7/10* (2006.01)
  *G06K 9/36* (2006.01)
(52) U.S. Cl.
  CPC .............. *G06K 9/36* (2013.01); *G09B 21/008* (2013.01); *H04N 1/603* (2013.01); *H04N 1/6011* (2013.01)

(56) References Cited

U.S. PATENT DOCUMENTS

| | | | |
|---|---|---|---|
| 7,344,250 B2 | 3/2008 | Sato | |
| 8,169,447 B2 | 5/2012 | Bhogal | |
| 8,421,811 B2 | 4/2013 | Odland | |
| 2002/0065658 A1* | 5/2002 | Kanevsky | G06F 16/9574 704/260 |
| 2003/0137547 A1* | 7/2003 | Brown | G06F 3/14 715/865 |
| 2004/0085327 A1 | 5/2004 | Jones | |
| 2005/0281237 A1* | 12/2005 | Heinonen | H04L 29/06 370/338 |
| 2006/0169783 A1 | 8/2006 | Gagne | |
| 2007/0236656 A1 | 10/2007 | Jeong | |
| 2011/0090453 A1 | 4/2011 | Chen | |
| 2013/0250078 A1* | 9/2013 | Levy | A61F 9/08 348/62 |
| 2014/0168056 A1* | 6/2014 | Swaminathan | G06F 3/147 345/156 |
| 2014/0218493 A1* | 8/2014 | Dialameh | H04M 1/72594 348/62 |
| 2015/0257012 A1* | 9/2015 | Zhang | H04L 12/14 455/454 |
| 2015/0287345 A1 | 10/2015 | Tanuwidjaja | |
| 2018/0357925 A1* | 12/2018 | Keohane | G09B 21/008 |
| 2019/0172347 A1* | 6/2019 | Chan | G08G 1/0967 |
| 2020/0160748 A1* | 5/2020 | Hans | G06K 9/00671 |

OTHER PUBLICATIONS

"5G tutorial | 5G system basics tutorial", RF Wireless World, © RF Wireless World 2012, RF & Wireless Vendors and Resources, Sep. 11, 2018 13:00, 14 pages, <http://www.rfwireless-world.com/Tutorials/5G-tutorial.html>.

"EnChroma® Color Blind Glasses", Enchroma, © 2019 EnChroma, 8 pages, <https://enchroma.com/>.

"T-Mobile and Ericsson sign major $3.5 billion 5G agreement", Sep. 11, 2018, Modern Slavery Statement Privacy Legal ©, 7 pages, <https://www.ericsson.com/en/press-releases/2018/9/t-mobile-and-ericsson-sign-major-$3.5-billion-5g-agreement>.

"Visual Recognition", 5 pages, <https://www.ibm.com/watson/services/visual-recognition/?cm_mmc=Search_Google-_-Watson+AI_Watson+-+Platform-_-WW_NA-_-+ibm>.

Authors: Anonymous; Method and means to modify visible colors displayed on a display or user interface to enhance a color blind person's experience; Dec. 21, 2016; Database: ip.com; ip.com No. IPCOM000248621D.

Azenkot et al., "Enabling Building Service Robots to Guide Blind People a Participatory Design Approach", 978-1-4673-8370-7/16 © 2016 IEEE, 10 pages.

Lausegger et al., "OmniColor D A Smart Glasses App to Support Colorblind People", iJIM vol. 11, No. 5, 2017, 18 pages, <https://doi.org/10.3991/ijim.v11i5.6922>.

Lausegger, Georg, "Google Glass app for colorblind individuals and people with impaired vision", OmniColor, Institute of Information Systems and Computer Media, Dec. 15, 2016, LinkedIn Corporation © 2019, 11 pages, <https://es.slideshare.net/sociallearning_tugraz/google-glass-app-for-colorblind-individuals-and-people-with-impaired-vision>.

Popleteev et al., "Colonizer: Smart Glasses Aid for the Colorblind", Conference Paper May 2015, DOI: 10.1145/2753509.2753516, ACM 978-1-4503-3500-3/15/05, 3 pages.

* cited by examiner

US 11,017,017 B2

REAL-TIME VISION ASSISTANCE

TECHNICAL FIELD

The present disclosure relates generally to the field of communication network services and more specifically to accessibility services provided by mobile communication networks.

BACKGROUND

Achromatopsia is a condition characterized by a partial or total absence of color vision. Achromatopsia is different from the more common forms of color vision deficiency (also called color blindness), in which people can perceive color but have difficulty distinguishing between certain colors, such as red and green. People with complete achromatopsia cannot perceive any colors, rather they see only black, white, and shades of gray. Incomplete achromatopsia is a milder form of the condition that allows for some color recognition. Achromatopsia is also associated with other problems that affect vision, including an increased sensitivity to light and glare (photophobia), involuntary back-and-forth eye movements (nystagmus), and significantly reduced sharpness of vision (low visual acuity). Affected individuals can also suffer farsightedness (hyperopia) or, less commonly, nearsightedness (myopia).

SUMMARY

A first embodiment of the present disclosure provides a computer-implemented method comprising the steps of: provisioning resources of a communication network to create a personal medical channel for communications of an end user device on the communication network; monitoring a streaming input of data transmitted over the communication network via the personal medical channel, wherein the data is streaming to or from the end user device; collecting the data of the streaming input and transmitting the data of the streaming input to an end service management and orchestration layer of the communication network; analyzing the data of the streaming input for situational context of content within the data and one or more objects forming the content; creating a situational-specific tag describing one or more objects of the content; detecting the one or more objects of the content being displayed by the end user device; embedding the situational-specific tag describing the one or more objects being displayed by the end user device; and displaying one or more objects comprising embedded situational-specific tags.

A second embodiment of the present disclosure provides a computer system comprising at least one processor; and a computer-readable storage media coupled to the at least one processor, wherein the computer readable storage media contains program instructions executing a computer-implemented method comprising the steps of: provisioning resources of a communication network to create a personal medical channel for communications of an end user device on the communication network; monitoring a streaming input of data transmitted over the communication network via the personal medical channel, wherein the data is streaming to or from the end user device; collecting the data of the streaming input and transmitting the data of the streaming input to an end service management and orchestration layer of the communication network; analyzing the data of the streaming input for situational context of content within the data and one or more objects forming the content; creating a situational-specific tag describing one or more objects of the content; detecting the one or more objects of the content being displayed by the end user device; embedding the situational-specific tag describing the one or more objects being displayed by the end user device; and displaying one or more objects comprising embedded situational-specific tags.

A third embodiment of the present disclosure provides a computer program product comprising: one or more computer readable storage media having computer-readable program instructions stored on the one or more computer readable storage media, said program instructions execute a computer-implemented method comprising the steps of: provisioning resources of a communication network to create a personal medical channel for communications of an end user device on the communication network; monitoring a streaming input of data transmitted over the communication network via the personal medical channel, wherein the data is streaming to or from the end user device; collecting the data of the streaming input and transmitting the data of the streaming input to an end service management and orchestration layer of the communication network; analyzing the data of the streaming input for situational context of content within the data and one or more objects forming the content; creating a situational-specific tag describing one or more objects of the content; detecting the one or more objects of the content being displayed by the end user device; embedding the situational-specific tag describing the one or more objects being displayed by the end user device; and displaying one or more objects comprising embedded situational-specific tags.

BRIEF DESCRIPTION OF THE DRAWINGS

FIG. 6b illustrates an embodiment of an end-user device displaying an output annotated using one or more situational-specific tags based on the situational context received by the end-user device as shown in FIG. 6a.

DETAILED DESCRIPTION

Overview

Figure 1:
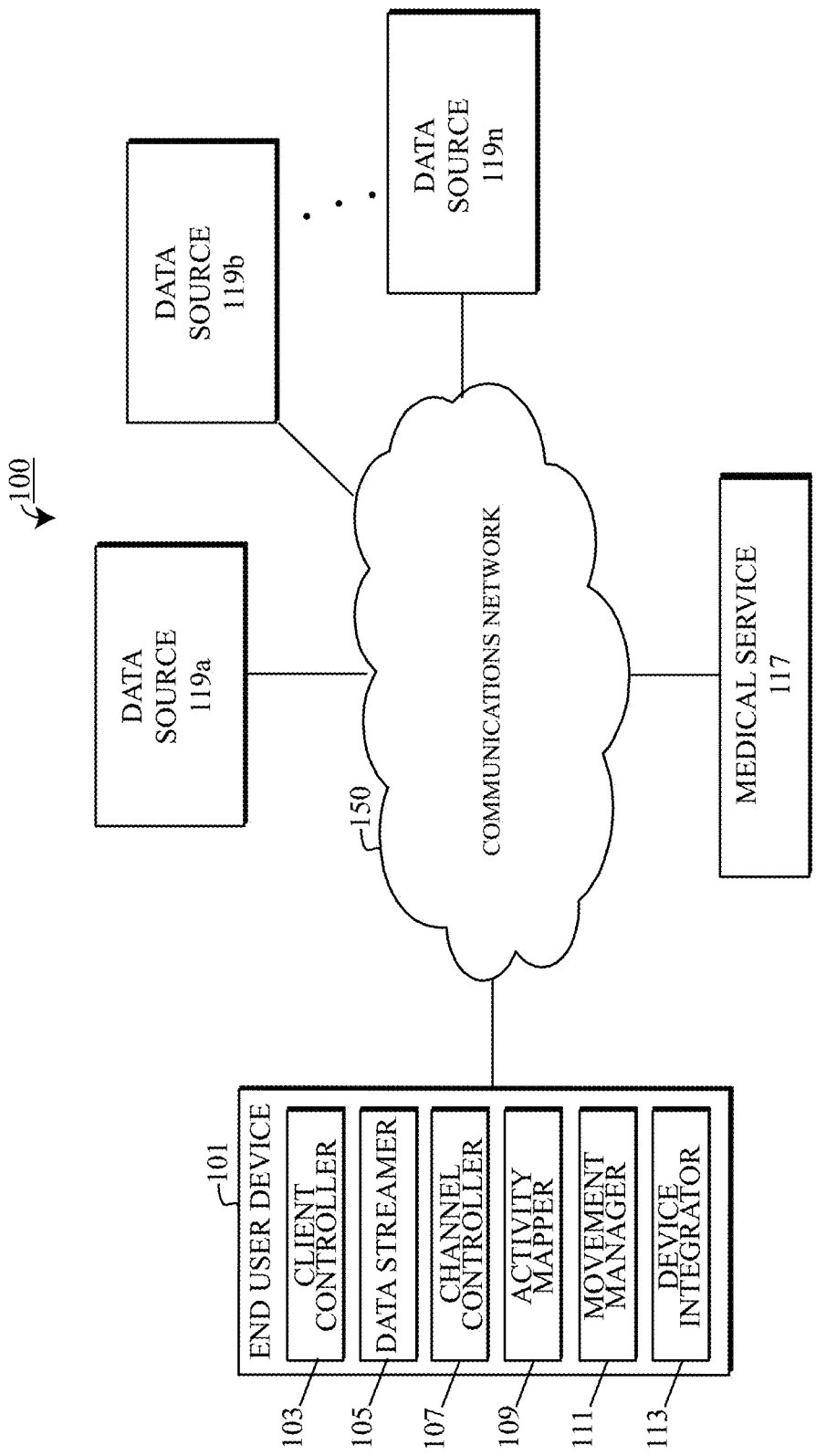
FIG. 1 depicts a functional block diagram describing an embodiment of a computing environment in accordance with the present disclosure.

Dynamic mechanisms that provide assistance to individuals suffering from achromatopsia, color blindness and other forms of visual impairments, based on time, situation and nature of a user's vision, are currently non-existent. Apparatuses that are available for correcting color-related vision impairments are directed toward modifying colors in a manner that allows for colors normally associated with vision impairments, to be modified in order to allow the unidentifiable colors to be more easily differentiated from the surrounding colors. For example, by applying color filters to lenses or adjusting the colors to be differentiable shades when viewed by the user. However, in situations where knowing the color of an object may be important contextually, existing color correction mechanisms fail to assist users by failing to descriptively identify the actual colors depicted. Rather, existing systems simply allow for easier color differentiation, but not color identification.

Embodiments of the present disclosure offer real-time (or near real-time) visual assistance to help users suffering from visual impairments by providing color-related details, visual descriptions and/or descriptive captions dynamically, based on the nature and context of the situation being viewed by the user. Specific identifying information and details can be presented to the user in real time by identifying data and objects being viewed by the user at any given point in time and dynamically annotating descriptions of the presented data and objects, allowing for the user to further understand the context of the displayed content. Embodiments of the present disclosure leverage the increasingly advanced data capabilities and services available using communication networks to implement assistance to users suffering from visual impairments. Embodiments of the present disclosure establish a personalized, bi-directional, data channel on a communication network, which may be used for routing network data between the end user device of the user suffering from visual impairments and additional devices and data networks communicating with the end user device. The communication network routes data and communications associated with the user along the communication network, through the established data channel, personalized to the user's preferences and condition. Monitoring tools of the communication network may monitor and analyze one or more streams of data being inputted through the user's personalized data channel. Monitoring tools analyzing the data being streamed through the personalized data channel may identify the situational context of the data as well as one or more data objects that are outputted to the display of the end-user device.

Services and/or applications available to the user via the communication network may create situational-specific tags using the analysis of the data streams. Situational-specific tags describing one or more properties of the data objects being displayed by the end-user device can be applied. The services and/or applications may embed the situational-specific tags in the data being streamed to the end-user device. Accordingly, the embedded tags describing the context and properties of the data objects being displayed by the end-user device may be visually displayed alongside the data objects, providing the user with additional data and context specific information that may allow for the user to overcome the user's visual impairments and allowing for the user to successfully understand the incoming data being displayed in a manner that may not have been possible without the added assistance of the embedded tags providing additional visual descriptions of the objects being displayed by the end-user device.

In the exemplary embodiment of the present disclosure, the communication network may take advantage of newly developed 5G mobile communication networks, which offer enhanced abilities to manage virtualized network resources and services. The mobile communication network may offer the personalized data channel as part of one or more network-accessible applications or services provided by the mobile communication network. The unique architecture of 5G mobile communication networks may include a service orchestration layer that may centrally coordinate the provisioning of network resources, create the data channel, perform data channel monitoring services as well as perform situational context identification, object identification, tagging and embedding operations.

Peripheral information describing the environment surrounding the end-user may be collected by the communications network to establish the situational context of the data being streamed through data channel and ultimately to the end user. Environmental data providing additional context to the streaming inputs of the data channel may be obtained using a plurality of techniques and additional data available via one or more additional data sources to provide situational insights. For example, situational context of the streaming data may be identified using one or more vision recognition services to recognize objects, people, places, natural language processing converting speech to text, gaze detection techniques to identify the subject of a user's gaze, browsing/social media histories, profile data from applications, services and websites, etc. Additionally, communication networks can leverage networks of existing devices connected to the communications network and virtual devices to obtain additional environmental context, including existing networks of sensor devices, devices that make up the internet-of-things, camera networks, networks of audio devices, client device networks, application servers, and GPS location data.

Embodiments of the present disclosure may integrate medical channel services provided by the personalized data channel of the communications network with smart displays and/or augmented reality applications, allowing for real-time virtual overlays of situational-specific tags onto or adjacent to physical objects being viewed by a user through the smart display. For example, a smart display device configured as a mobile phone or smart glasses, comprising a camera system recording the environmental surroundings. The input from the camera system is passed through the data channel of the end user and analyzed by the communication network in conjunction with data passing through the data channel from other data sources. Objects recorded by the camera system can be identified and provided a situational-specific tag. As the end user focuses the camera system on one or more objects that are the subject of the streaming inputs into the data channel, the display device of the smart device can implement augmented reality to overlay one or more embedded tags onto the recorded objects of the surrounding environment. Thus, providing the user real-time vision assistance using augmented reality to overlay situation-specific tags onto the physical objects viewed through the smart display devices while connected to the services provided by the communication network.

System for Providing Real-Time Vision Assistance

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIGS. 1-6d depict diagrams of a computing environment 100 capable of providing vision assistance to users of an end-user device 101 who may be suffering from one or more conditions causing visual impairments. Embodiments of computing environment 100 may include a plurality of computer systems and devices interconnected via a communications network 150. The interconnected computer systems and devices of communications network 150 may access one or more network accessible computer systems, devices, applications, services and/or data source(s) 119a, 119b . . . 119n (referred to generally herein as "data sources 119"), either real or virtual, that may be available via communications network 150. For example, end user device 101 can connect to communications network 150 and access data sources 119 such as applications and services 203 provided by the communications network 150, including medical services 117, location services 241, analytics database 239, tag database 243 and other network applications or services that may be available. In some embodiments, a data source 119 accessible to the end user device 101 may include computers, systems and devices (real or virtual) being maintained by the communication network 150. For example, in addition to applications and service 203, data source 119 can include data-producing or data collecting devices and systems, including but not limited to, one or more networks of internet-of-things (IoT) devices, sensor devices, and/or client devices connected to or placed in communication with, the communication network 150.

Figure 8:
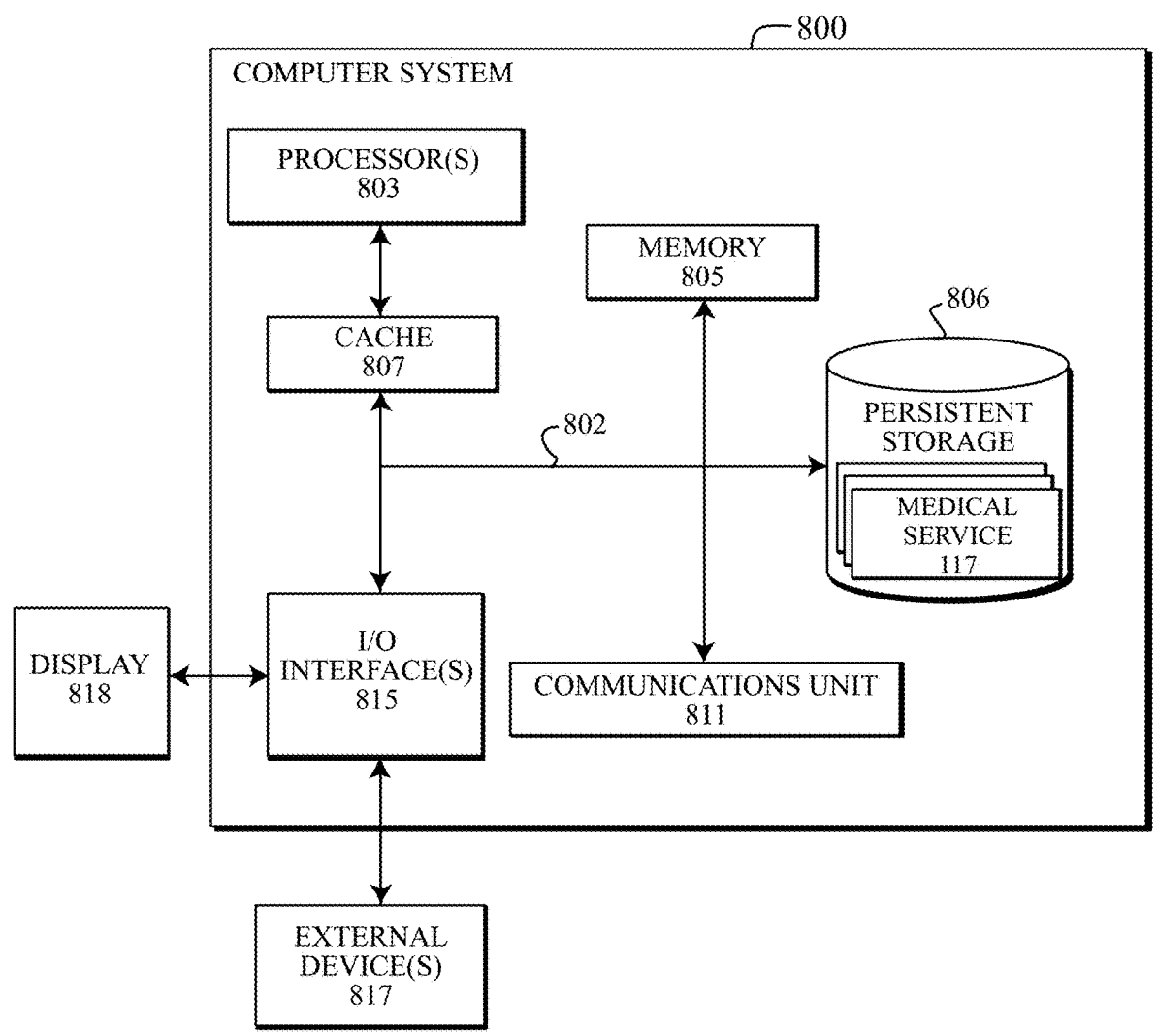
FIG. 8 depicts an embodiment of a block diagram of internal and external components of a computer system in accordance with the embodiments of the present disclosure.

Embodiments of the end-user device 101, data sources 119, and the underlying infrastructure and resources 209 of communications network 150, may each be a specialized computer systems comprising specialized configurations of hardware, software or a combination thereof, as shown and described in FIGS. 1-6d of the present disclosure and in embodiments described herein. Embodiments of the end-user device 101, infrastructure and resources 209 and data sources 119 may not only comprise the elements and components of the systems and devices depicted in FIGS. 1-6d but may also incorporate one or more elements of a computer system 800, as shown in FIG. 8 and described in the COMPUTER SYSTEM section below. One or more components of the computer system 800 may be integrated into each of the specialized computer systems of computing environment 100 including the integration of one or more processor(s) 803, communications fabric 802, memory 805, persistent storage 806, cache 807, communications unit 811, I/O interface(s) 815, external device(s) 817 and/or human-readable display(s) 818.

Embodiments of an end-user device 101, and computer systems operating as a data source 119 may be desktop computers, laptop computers, tablet computers, smartphones, IOT devices, sensor devices, wearable computing devices (such as glasses and watches), servers, or any other type of computer system 800 known by persons skilled in the art. In some embodiments, the end-user device 101 and data sources 119, may represent computer systems utilizing clustered computers and components to act as a single pool of seamless resources when accessed through communications network 150. For example, such embodiments may be used in a data center, cloud computing environment, storage area network (SAN), and network attached storage (NAS) applications. In certain embodiments, end-user device 101, data sources 119, and other network accessible systems may represent virtual machines provisioned by a host computer or the communications network 150. For example, communications network 150 creating an virtualized instance on the network such as the end user network slice 223 depicted in FIG. 2, wherein the end user device 101 is provisioned virtual network resources 225 and a personal medical channel 227 for routing streams of data associated with the end user device 101 through the communications network 150 to end user device 101 and/or other systems and devices that may be communicating with the end user device 101. In general, end-user device 101, data sources 119 and other network accessible systems may be representative of any electronic devices, or combination of electronic devices, capable of executing machine-readable program instructions.

Embodiments of the end-user device 101, may access one or more services, applications and data sources 119, including the medical services 117 of the communication network 150 by establishing a connection with communications network 150 and being granted access to the medical services 117, systems, devices and data sources 119 maintained by the communications network 150. Embodiments of communications network 150 may be constructed using wired, wireless or fiber optic connections. Embodiments of end-user device 101, data sources 119 and other network accessible systems, clients and devices may connect and communicate over communications network 150 using a communications unit 811, such as a network interface controller or other network communication hardware. Embodiments of the communications unit 811 may implement specialized electronic circuitry, allowing for communication using a specific physical layer and a data link layer standard. Communications unit 811 may further allow for a full network protocol stack, enabling communication over communications network 150 to end-user device 101, data sources 119, client devices and other systems and devices on the communications network 150, linked together through the communication channels of the communication network 150.

Communications network 150 may facilitate communication and resource sharing among end-user device 101, data sources 119 and other network accessible devices and systems connected to the communications network 150. Examples of communication network 150 may include a local area network (LAN), home area network (HAN), wide area network (WAN), back bone networks (BBN), peer to peer networks (P2P), storage area network (SAN), campus networks, enterprise networks, the Internet, cloud computing networks and any other network known by a person skilled in the art. In the exemplary embodiment, communications network 150 may be a mobile communications network. In some embodiments, the mobile communications network may be a 5G mobile communication network.

Figure 2:
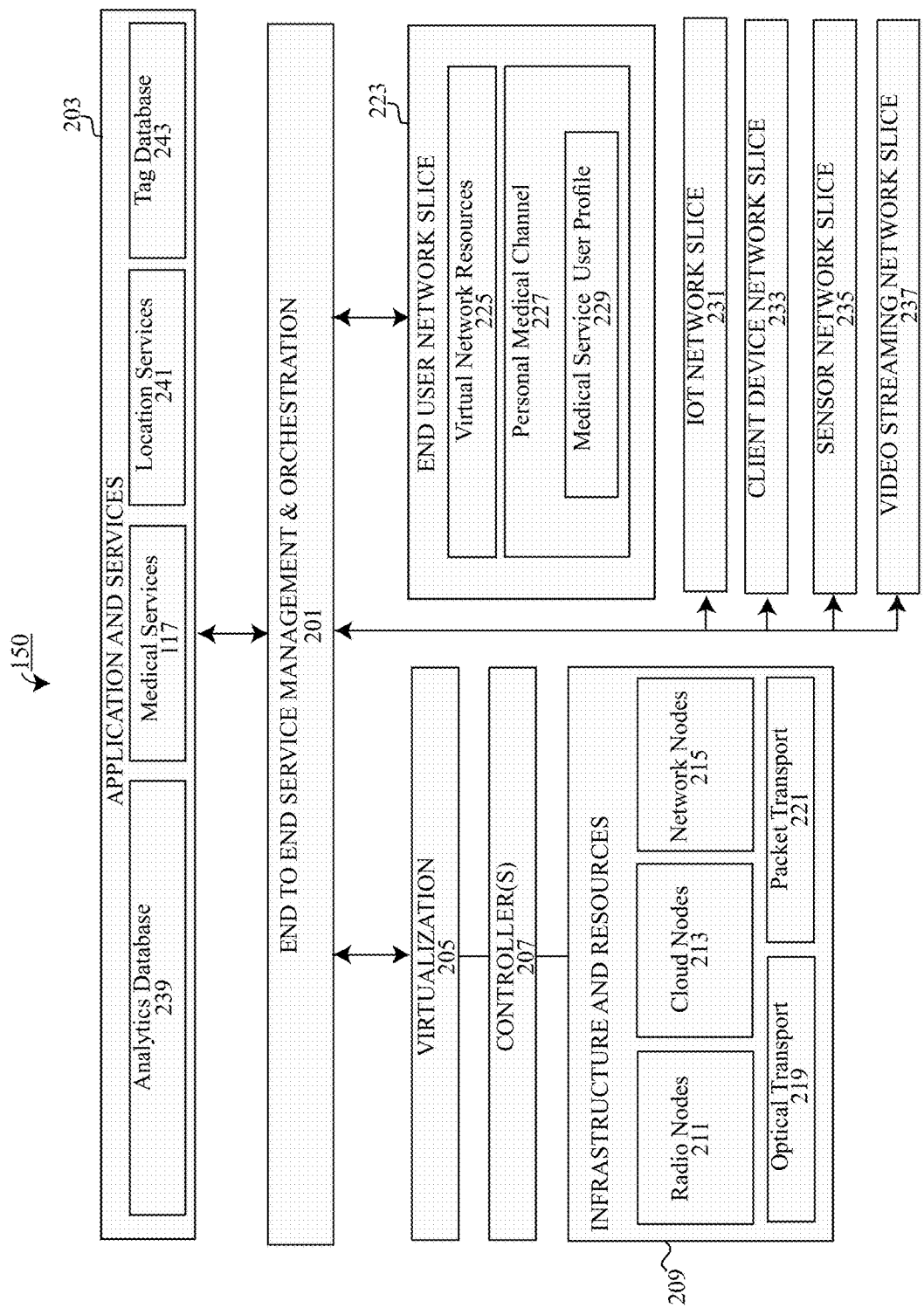
FIG. 2 depicts a functional block diagram describing an embodiment of 5G mobile communication network architecture in accordance with the present disclosure.

Referring to the drawings, FIG. 2, depicts an example of a 5G mobile communication network (abbreviated herein as "5G network") architecture. The framework of a 5G network may comprise three main layers, an infrastructure and resources 209 layer, a network function layer (comprising virtualization 205 and network slices 223, 231, 233, 235, 237) and an application and services 203 layer, wherein each layer is managed by end to end service management and orchestration 201.

The infrastructure and resources 209 layer may define the physical network architecture. The architecture of the physical network can include radio access networks comprising one or more radio nodes 211, a core network of network nodes 215 and/or cloud nodes 213 (edge cloud, remote cloud, and/or core cloud). Network function (i.e. network slices 223, 231, 233, 235, 237) and virtualization 205 layers may execute operations to manage virtual resources and each network function's life cycle as well as facilitate optimal placement of network slices 223, 231, 233, 235, 237 to virtual resources or chaining multiple slices to meet specific requirements of particular services or applications. As shown in FIG. 2, 5G networks may utilize a common set of underlying physical infrastructure and resources 209 to support network communications data throughout the communication network 150, create a plurality of individual virtual networks dedicated to servicing network tenants and customers using software defined networking (SDN) and/or network function virtualization (NFV).

The virtualized instances operating as part of the 5G network may be referred to as network slices 223, 231, 233, 235, 237 or network functions. Each network slice 223, 231, 233, 235, 237 may be derived from a unified physical network infrastructure, but the network slices 223, 231, 233, 235, 237 may feature a logical arrangement that may be separated as individual sections of the network, as shown in FIG. 2. Embodiments of the underlying infrastructure and resources 209 supporting the network functionality may include radio nodes 211, cloud nodes 213, network nodes 215, as well as one or more transport networks (i.e. optical transport 219 and packet transport 221) enabling the delivery of data across the communications network 150 to the edge devices and nodes that make up the communication network 150.

Embodiments of radio nodes 211 that may comprise the 5G network, may be a plurality of 5G specific systems or legacy systems that may have been available prior to the implementation of 5G networking. Embodiments of the radio nodes 211 may include 5G radio nodes and towers alongside Wi-Fi, and infrastructure previously used by 1g, 2g, 3g, 4g and long-term evolution (LTE) networks. For example, embodiments of the radio nodes 211 can include one or more radio access networks, such as generic radio access networks (GRAN), GSM edge radio access networks (GERAN), UMTMS terrestrial radio access networks (UTRAN) and evolved universal terrestrial radio access networks (E-UTRAN). New 5G radio nodes 211 may include new frequency bands broadcasting data using micrometer waves, millimeter waves and/or picometer waves. In some embodiments the radio nodes 211 of the communication network 150 may be integrated to perform both 5G and legacy communication functions. These integrated radio nodes 211 may be a multiple-input and multiple-output (MIMO) node, capable of broadcasting and receiving a plurality of different types of radio signals, both 5G and an assortment of legacy distributed network communications.

Embodiments of the underlying physical infrastructure and resources 209 of the 5G network may further include the systems and devices that form traditional data networks and cloud networks. The nodes that form the underlying cloud networks (i.e. cloud nodes 213) and the underlying data networks (i.e. network nodes 215) may include a plurality of servers, routers, switches, gateways, storage devices, and access nodes (such as one or more client devices and/or end user systems). The resources of the physical infrastructure that underly the communication network 150 may be physically managed and provisioned by one or more controller(s) 207. Embodiments of the controller(s) 207 may include one or more network controllers, radio access network (RAN) controllers and/or a cloud network controllers. Controller(s) 207 can perform resource management, mobility management and data encryption on incoming signals processed by the nodes of the communication network 150. Network controllers can manage the flow of data at the physical layer of the communication network 150, directing switches and each of the nodes of the communication network 150 where to send packets of data, to facilitate communications between networked systems, devices, applications and services.

Embodiments of 5G networks may manage physical infrastructure and resources 209 across a plurality of network slice 223, 231, 233, 235, 237 instances by using virtualization 205 of the communication network 150 resources, logically dividing the resources between different applications and services 203 accessible via the communication network 150 and the network slices 223, 231, 233, 235, 237 running as separate instances on the communication network 150. Virtualization of infrastructure and resources 209 as well as the implementation of one or more software defined network controllers, may allow for centralized network control that can manage the physical infrastructure and resources 209, and provision the requested resources to one or more instances of a network slice 223, 231, 233, 235, 237 utilizing application and services 203 provided to the network slice 223, 231, 233, 235, 237. The centralized network control by the communications network 150 may be referred to as end to end service management and orchestration 201, as represented generally in the block diagram of FIG. 2 and more specifically in the embodiment depicted in FIG. 4. The end-to-end computing architecture of 5G communication networks can separate the network controls and forwarding functions, allowing for the end to end service management and orchestration 201 to become directly programmable and control the underlying infrastructure and resources 209 being abstracted for applications and services 203 using software-defined networking (SDN).

Network slicing allows operators of communication networks 150 to build multiple isolated virtual networks on a shared physical network to accommodate a wide variety of applications and services 203. Using virtualization 205 to form network slices 223, 231, 233, 235, 237 that partition a shared physical network infrastructure and resources 209 into multiple end-to-end level logical networks, allows for traffic groupings and isolation of tenant traffic. Network slicing can provide flexible deployment of one or more applications and services 203, provided by a service provider, based on the requirements of the service/application, allowing for service providers to build and set up their own virtual network infrastructure according to the demands of the applications and services 203 being provided to the end user. Customization of network slices 223, 231, 233, 235, 237 can ensure that virtualized network functions are mapped to physical resources in manner that prevents violation of service level agreements (SLA) for accessing the appropriate applications and services 203.

Embodiments of communications networks 150 may comprise an end to end service management and orchestration 201 (abbreviated herein as "E2E management 201") module, as shown in the exemplary embodiment of FIG. 2. E2E management 201 monitors and manages the functions of the infrastructure, virtualization 205, network slices 223, 231, 233, 235, 237 and the application and services 203 layers of the communication network 150. Functions of E2E management 201 may include creation of one or more virtualized instances of network slices 223, 231, 233, 235, 237 of the physical network using the infrastructure and resources 209; mapping network functions to the virtualized instances of the network slices 223, 231, 233, 235, 237 to build a service chain with the association of the network slices 223, 231, 233, 235, 237 and virtualization 205 layer; and maintain communication between the application and service 203 layer and the network slices 223, 231, 233, 235, 237 in order to manage the life cycle of each instance comprising a network slice 223, 231, 233, 235, 237 and dynamically adapting or scaling virtual network resources 225 as needed.

Figure 4:
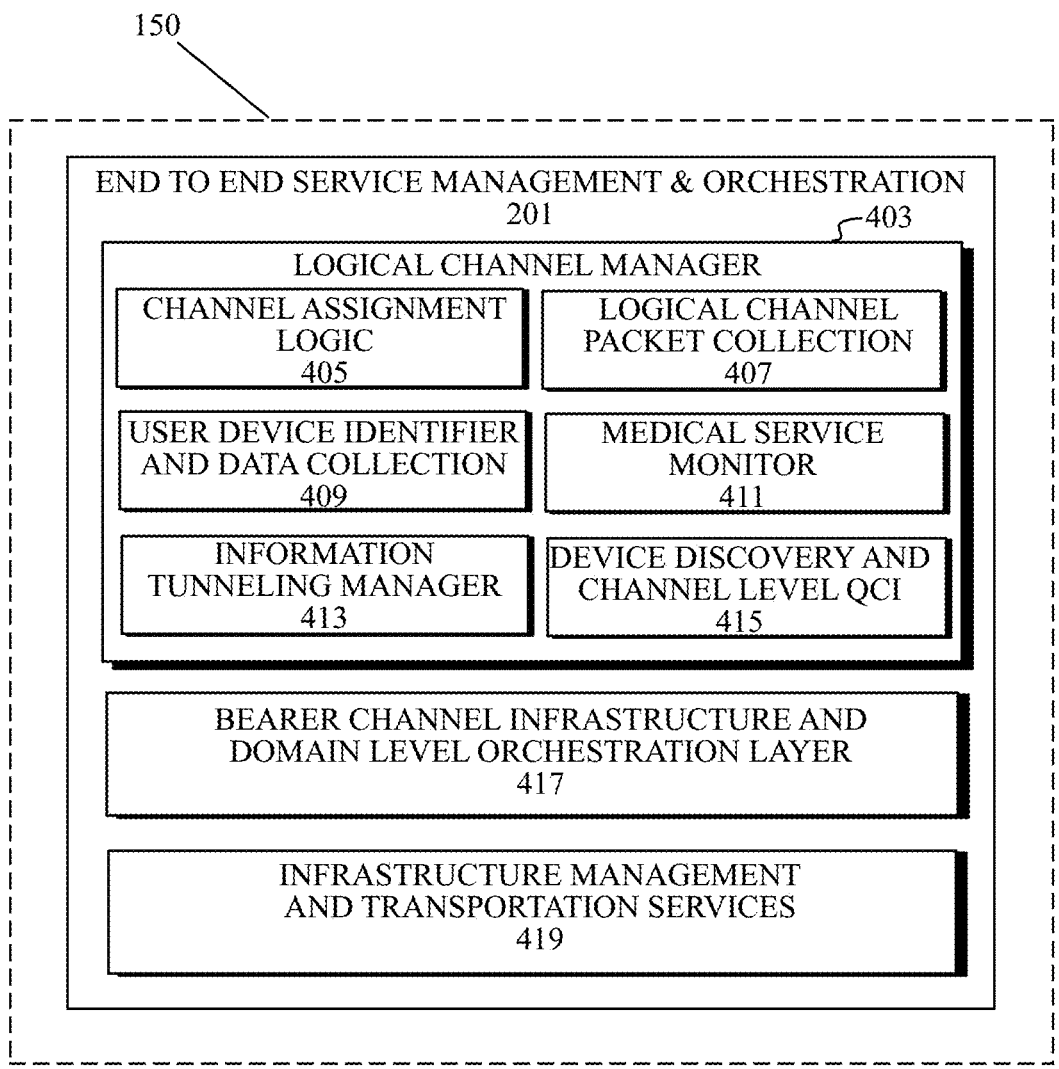
FIG. 4 depicts a functional block diagram describing components of an end to end service management & orchestration layer of a 5G mobile communication network.

Referring to the drawings, FIG. 4 depicts a block diagram of an embodiment of an E2E management 201 module of communications network 150. As depicted by the embodiment of FIG. 4, E2E management 201 may comprise a plurality of components or modules that may be tasked with performing one or more functions of the communications network 150, including the creation of network slices 223, 231, 233, 235, 237, provisioning virtual network resources 225 to the network slice 223, 231, 233, 235, 237, coordinating the flow of traffic on the communication network 150 to the appropriate network slice 223, 231, 233, 235, 237 and/or coordinating application and services 203 being utilized by each network slice 223, 231, 233, 235, 237. The term "module" may refer to a hardware module, a software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 805 devices and/or persistent storage 806 devices. A software-based module may be part of a program, program code or linked to program code containing specific programmed instructions loaded into a memory 805 device or persistent storage 806 device of the communication network 150 and/or a virtualized memory or virtualized storage thereof. As shown by the exemplary embodiments of FIG. 4, embodiments of the E2E management 201 may include one or more modules or components, including, but not limited to, bearer channel infrastructure and domain level orchestration layer 417, infrastructure management and transportation services 419, and logical channel manager 403.

Embodiments of the bearer channel infrastructure and domain level orchestration layer 417 (abbreviated "bearer services 417") of the E2E management 201 module may provide a service that facilitates transmission of one or more information signals between network interfaces, user interfaces and/or between access points of the communication network 150. For example, bearer services 417 manages the data transmission of a physical radio network comprising one or more radio nodes 211. Embodiments of bearer services 417 may control and manage the transfer of user data and controller signals between two pieces of physical infrastructure and equipment on the communication network 150 as well as control the speed messages may be sent between the equipment of the infrastructure and resources 209 layer. Bearer services 417 may be categorized by the information transfer characteristics, methods of accessing the service, interworking requirements (to other networks), and other general attributes. Information characteristics may include data transfer rate, direction(s) of data flow, type of data transfer (circuit or packet) and other physical characteristics. The access methods may determine the parts of the system control that might be affected by the bearer service 417. For example, some bearer services cross different types of networks (e.g., wireless and wired) and the data and control information may need to be adjusted depending on the type of physical networks (i.e., radio, cloud, core, etc.). Other general attributes that may be controlled by the bearer services 417 may include the specification of a minimum quality level for the applications and services 203 running on the communication network 150 or special conditional procedures such as automatic re-establishment of a bearer service 417 after the bearer service 417 has been disconnected due to interference.

Embodiments of the infrastructure management and transportation services 419 (abbreviated "transport services 419") of the E2E management 201 module may provide transport layer services within the communication network 150, interconnecting the physical infrastructure and resources 209 with the applications and services 203 by providing host-to-host communication services for the applications and/or services of the communication network 150 using one or more transport protocols (i.e. UDP, TCP and IP). Transport services 419 may prepare application and service data for transport over the communication network 150 and process the network data for use by the application and services 203 of the communication network 150. Embodiments of transport services 419 may be conveyed to applications and services 203 of the communication network 150 via a programming interface in some embodiments and may include network services such as establishing application sessions, providing connection oriented communication, process-to-process communication, ensuring packet transmission reliability, error detection and control, flow control of data packets, same order delivery of data, network congestion control and multiplexing.

Embodiments of the E2E management 201 module may comprise a logical channel manager 403. Embodiments of the logical channel manager 403 may perform the function or task of controlling the creation, allocation, characteristics, authorization and monitoring of logical data channels associated with one or more network slices 223, 231, 233, 235, 237 that may be utilizing the medical services 117 (or other applications and services 203 of the communication network 150). The logical channels may be partitioned or assigned portions of physical radio and/or data channels of the communication network's 150 infrastructure and resources 209. Embodiments of the logical channel manager 403 may include one or more components or modules that may perform a specific function or task of the logical channel manager. For example, in the exemplary embodiments of the logical channel manager 403 depicted in FIG. 4, the logical channel manager 403 comprises a plurality of modules, including a channel assignment logic 405 module, logical channel pack collection 407 module, user device identifier and data collection 409 module, medical service monitor 411, information tunneling manager 413 and devices discovery and channel level QCI 415 module.

Embodiments of the channel assignment logic 405 module may perform the tasks and/or functions of the logical channel manager 403 associated with the creation of the personal medical channel 227 as part of the end user network slice 223 that a user of the end user device 101 may be provided in order to use the medical services 117 of the communication network 150 for the purpose of obtaining real-time vision assistance. Embodiments of the channel assignment logic 405 may allocate a particular amount of virtual network resources 225 dedicated to the end user network slice 223 comprising the personal medical channel 227. Embodiments of the channel assignment logic 405 module may provision end-to-end resources of the communication network 150 that the medical services 117 may require to perform real-time vision assistance at all layers of the communication network 150. The device discovery services and channel level QCI 415 may manage the characteristics of the personal medical channel 227 and to ensure bearer traffic of the communication network 150 is allocated appropriately for the personal medical channel 227 by classifying the quality of service for the type of traffic being experienced by the personal medical channel 227. For example, by setting characteristics such as whether bit rate as guaranteed or non-guaranteed, priority handling, packet delay budget, and packet loss error rate. QCI characteristics in terms of packet forwarding treatment that the bearer traffic receives edge-to-edge between the end user device 101 and network's gateway may be standardized in accordance with known standards. Scheduling priority, resource type, packet delay budget and packet error loss rate may be a set of characteristics defined by the known standards.

Embodiments of the logical channel manager 403 may comprise an end user device identifier and data collection 409 module, information tunneling manager 413 and logical channel packet collection 407 module. Embodiments of the end user device identifier and data collection 409 module perform functions or tasks of identifying the end user device 101, identifying additional devices and systems communicating with the end user device 101 over the communication network 150 via the personal medical channel 227. Embodiments of the end user device identifier and data collection 409 module may determine which devices and/or systems may be streaming inputs through the personal medical channel 227 and the subsequent output location of the streaming inputs to the end user device 101 or the systems or devices communicating with the end user device 101. Embodiments of the information tunneling manager 413 may authenticate the end user device 101 and/or the devices and systems communicating with the end user device 101 over the personal medical channel 227 and may further enable data capture of the streaming input data being sent via the personal medical channel 227. Once the data capture has been authorized by the informational tunneling manager 413, the logical channel packet collection 407 module may perform the function of inline packet capture at the channel level for the personal medical channel 227.

Embodiments of the logical channel manager 403 may comprise a medical service monitor 411 module. The medical service monitor 411 module may be a subscription based service and/or contractually agreed upon or provided service, that may be requested or purchased by the end user for receiving access to the medical services 117 provided by the communication network 150. The medical service monitor 411 may deploy the medical services 117 requested by the end user, coordinate the implementation of medical services 117 and delivery of the outputted data from the medical services 117 providing real-time vision assistance to the end user device 101, in a manner consistent with the agreed upon level of service requested to be provided by the medical services 117. In some embodiments of the medical service monitor 411, the medical service monitor 411 may include functions of a software-defined mobile network coordinator (SDM-X) responsible for monitoring and performing interslice management of dedicated and/or shared network slices providing medical services 117 to the end user of the end user network slice 223. Each instance of an end user network slice 223 may be comprise a software-defined mobile network controller (SDM-C) responsible for managing individual end user network slice 223 virtual network resources 225, taking into account the requirements and constraints of the end user network slice 223 imposed by device discovery and channel level QCI 415 module. Based one or more performance reports received by the device discovery and channel level QCI 415 module, the medical service monitor 411 may adjust the end user network slice 223 configuration to improve quality of medical service 117 being provided by a particular end user network slice 223. For example, by provisioning additional virtual network resources 225 to an end user network slice 223.

Referring back to the drawing of FIG. 1, the embodiment of FIG. 1 depicts a computing environment 100 comprising an end user device 101 accessing medical services 117 (or other applications and services 203) provided by a communications network 150 to receive real-time vision assistance using a dedicated personal medical channel 227. Embodiments of the end user device 101 may be equipped with one or more components and/or modules that allow for the end user device 101 to access and interface with the medical services 117 provided by the communications network 150. The components and/or modules of the end user device 101 may include (but are not limited to) a client controller 103, data streamer 105, channel controller 107, activity mapper 109, movement manager 111, and/or device integrator 113.

Embodiments of the client controller 103 may be a hardware device or software program that may manage the flow data between the end user device 101, the communications network 150 and/or the client devices communicating with the end user device 101 via the communications network 150. Client controller 103 may control initialization requests to access the personal medical channel 227 of the end user network slice 223 and control the physical state of the end user device 101, including one or more internal or external devices 817 of the end user device 101. For example, camera systems 507, audio systems, recording devices, end user device 101 sensors, and/or human-readable displays 818.

Embodiments of the end user device 101 may include a data streamer 105 module. The data streamer 105 may perform the functions or tasks of the end user device 101 associated with transmitting data from the end user device 101 to the E2E management 201 module of the communications network 150. Embodiments of the data streamer 105 may operate in coordination with a channel controller 107 to deliver the streaming data from the end user device 101 to the personal medical channel 227. The channel controller 107 may be a dedicated channel or central channel that may be used for signaling between the nodes of a radio network comprising radio nodes 211, as well as cloud networks and/or core networks comprising cloud nodes 213 and/or network nodes 215 respectively. The dedicated channel controlled by the channel controller 107 may be the personal medical channel 227 which may operate as a point-to-point, bidirectional channel that transmits dedicated control information between the end user device 101 and the communication network 150.

In some embodiments of the end user device 101, the end user device 101 may comprise one or more components that may be capable of providing situational context about the end user device that may be useful to the medical services 117 for vision assistance. For example, in some embodiments, the end user device 101 comprises an activity mapper 109 and/or a movement manager 111. Embodiments of the activity mapper 109 may perform the function or task of monitoring and/or tracking end user device 101 activity on the communications network 150, including tracking end user device 101 specifications, the presence of running applications, application states, and inputs into the end user device 101. The activity mapper may forward the tracked activity of the end user device 101 to E2E management 201. Movement manager 111 may manage and record changes in the end user device 101 locations using one or more available location applications or services and forward the location data to the E2E management 201 which may process the location data via location services 241 or other available location mapping applications or services.

Embodiments of the end user device 101 may be equipped with a device integrator 113 which may act as an interface between the end user device 101 and applications and services 203 of the communication network 150. Embodiments of the device integrator 113 may be a device-level application programming interface (API) that enables the end user device 101 to transmit data to the medical services 117 or other applications and services 203 that are made available to the end user device 101 via the communication network 150. Embodiments of medical services 117 may comprise a client trigger and communication API 335 for receiving and interfacing with the API of the end user device 101. In some instances, the device integrator 113 may allow for the medical services 117 or other applications and services 203 of the communication network 150 to control the end user device and serve as a function interface (when permission is granted by the end user device 101 to do so). For example, controlling a camera system 507, sensors, and/or human-readable display 818 via the API and pushing data collected by the end user device 101 to the personal medical channel 227 to assist with providing context of the surrounding environment.

Service providers providing medical services 117 to the user and/or end user device 101, may offer end users access to the medical services 117 in accordance with terms, conditions and service level agreed upon between the service provider and the end user. For example, an end user can acquire access to a personal medical channel 227 and obtain medical services 117 via the communication network 150 by purchasing a subscription to the medical services 117, obtaining a license from the service provider, paying the service provider a fee, qualifying for the medical service 117 as part of a voluntary program and/or by being eligible under government-run program, etc. Upon entering into an agreement with the service provider to obtain access to medical services 117, authorization may be granted allowing the end user to access the medical services 117 from the service provider via a connection to the communication network 150. In some embodiments, the end user may register one or more end user devices 101 with the personal medical channel 227. In some instances, an end user may establish an ad-hoc network of end user devices 101 which may comprise a master end user device that may enable multiple levels of devices for a single user of the personal medical channel 227. For example, an ad-hoc network of sensor devices, camera systems 507, voice sensors, microphones, IoT devices, one or more human-readable displays 818, etc. streaming data through the personal medical channel 227 to an API running on a mobile communication device and controlling the data collection by the members of the end user's ad-hoc network.

Embodiments of the communication network 150 may create a virtual network using virtual network resources 225 to provide the user with the personal medical channel 227. The newly created virtual network may be referred to as the end user network slice 223, as shown in the exemplary embodiment of FIG. 2. Embodiments of the end user network slice 223 may comprise the bi-directional communication channel (the personal medical channel 227). The communications network 150 may direct communications, including audio, video, voice, text and other data, being transmitted or received by the end user device 101 and/or other data sources 119 communicating with the end user devices 101 on the communication network 150 as streaming inputs passing through the personal medical channel 227 device. By passing communications through the personal medical channel 227, the E2E management 201 and medical services 117 can centralize data monitoring and analysis of the streaming data passing to and from the end user device 101. Embodiments of the medical services 117 may analyze and monitor the streaming data being inputted into the personal medical channel 227 (referred to as "streaming inputs") for situational context and information about the end user's surrounding environment. As a function of the medical service's 117 analysis of the streaming inputs, medical services 117 may tag objects of the streaming inputs with situational-specific tags selected from a tag library 311 and output the tagged data to end user device 101.

Figure 5:
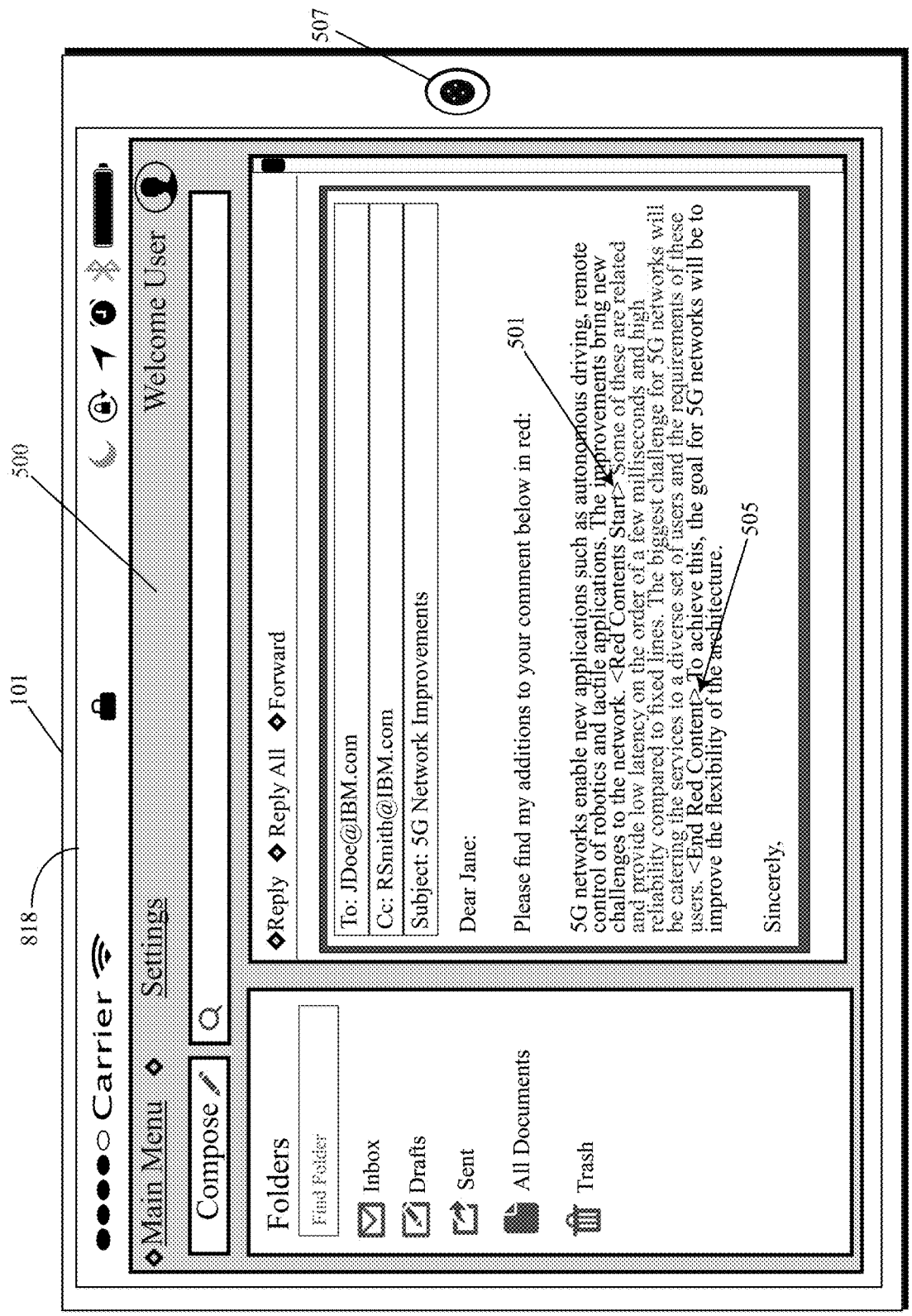
FIG. 5 illustrates an embodiment of a graphical user interface displaying data outputted to an end-user device annotated by situational-specific tags.
Figure 6A:
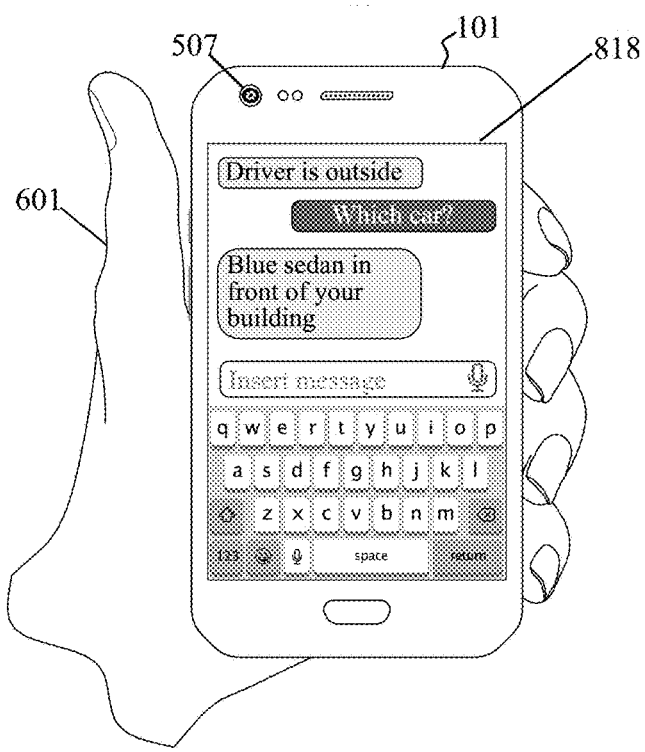
FIG. 6a illustrates an embodiment of an end-user device streaming input data describing situational context for analysis by a medical service of a communication network.
Figure 6B:
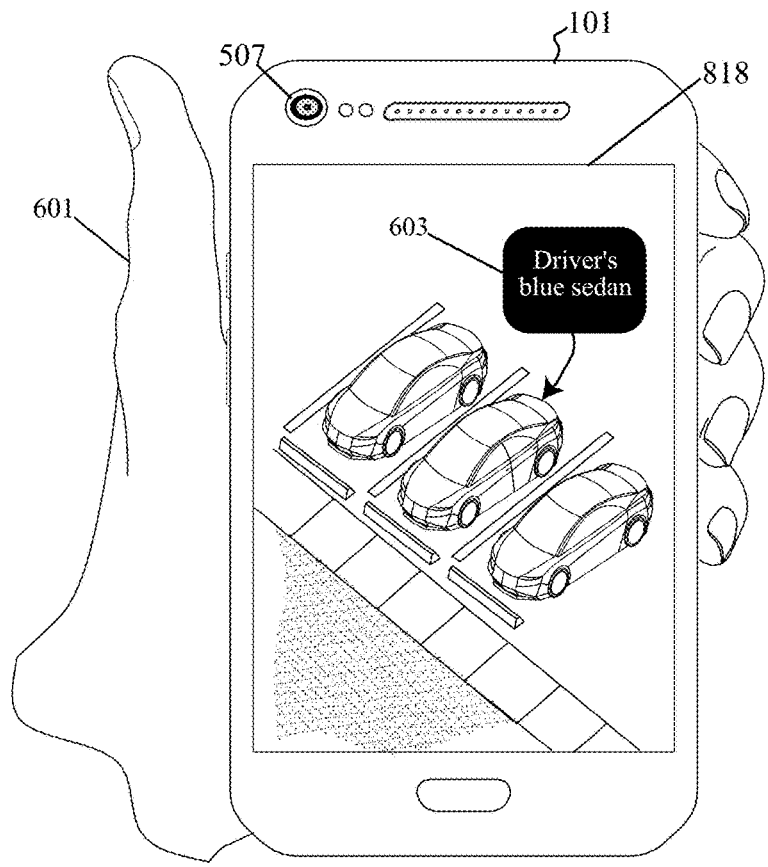
Figure 6C:
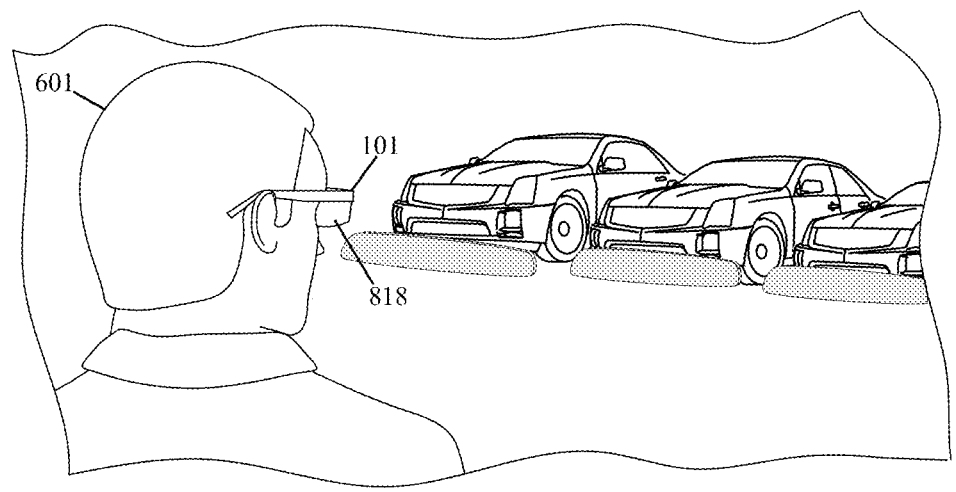
FIG. 6c illustrates an embodiment of an end-user viewing objects in a physical world via an embodiment of an end user device operating as a smart display device.
Figure 6D:
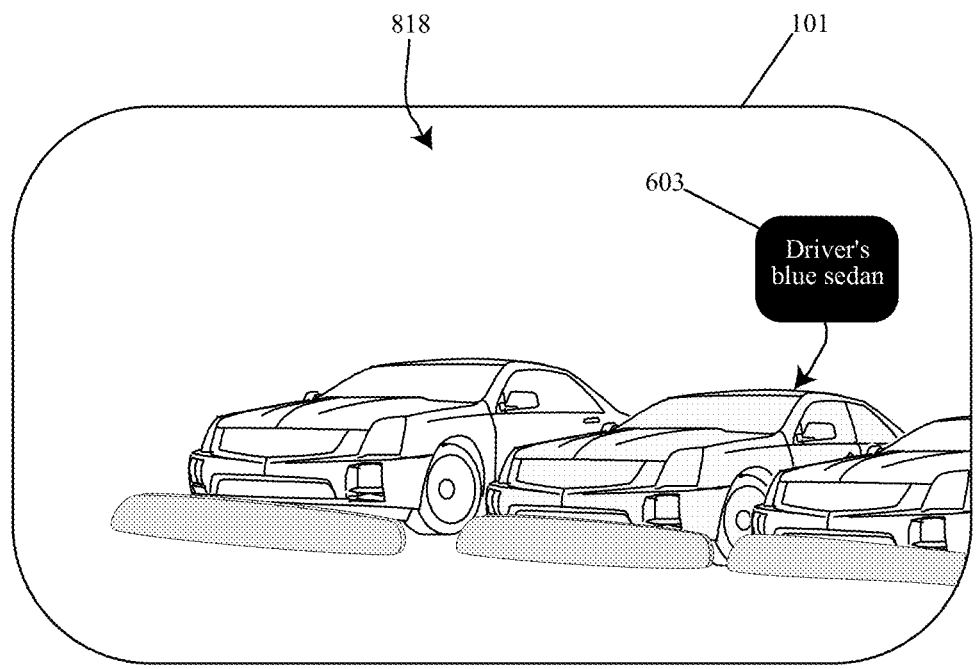
FIG. 6d illustrates an embodiment of an end-user device overlaying situational-specific tag data onto the objects of the physical world as viewed through the smart display device of FIG. 6c based on the streaming inputs providing situational context as described by FIG. 6a and/or FIG. 6b.

Referring to the drawings, FIGS. 5-6d depict examples of data being streamed to the end user device 101 from one or more data sources 119 (such as another client device of the communication network 150, IoT devices, sensor devices, etc.), analyzed by the medical services 117, wherein one or more portions of the data being displayed by the end user device 101 is tagged with situational-specific tag to assist the end user with visual details depicted by the displayed data that may be difficult to discern without assistance from the medical services 117. In the example presented in FIG. 5, a graphical user interface 500 is depicted as being displayed by a human-readable display 818 of the end user device 101. In this particular example, the interface 500 is an interface of an email program, although any type of interface may be present. It should be noted that the embodiment depicted is only one possible example of the uses of the medical services 117. As shown in the example of FIG. 5, an end user device 101 can receive a streaming input of data, such as the email message (as shown in this example). The email message contains situational specific contextual information that indicates part of the email contains colored text (i.e. red text in the example). The end user suffering from a color blindness may not be able to identify the portion of colored text provided by the second user sending the email message to the end user suffering from color blindness, without further assistance from the medical services 117.

Embodiments of the medical services 117 analyze and monitor the streaming inputs sent to the end user device 101 via the personal medical channel 227. Packets of information comprising the email message travel through the personal medical channel 227, where the message can be analyzed. From analyzing the message transmitted through the personal medical channel 227 in FIG. 5, the medical services 117 can identify important features that provide context to the data sent to the end user that may be situationally relevant to the end user understanding the message. In the example of FIG. 5, the medical services 117 identify that the text of the message provided in the email indicates that comments from the sending user are in a red font. Moreover, the medical services 117 may use one or more techniques, such as data analysis of the email's markup code, imaging techniques, vision recognition or other techniques to locate the position of the red colored text within the message. The sections of the message identified with the red text can be tagged with one or more situational-specific tags 501, 505 to identify the position of the red text to the end user receiving the message. As shown, a first tag 501 can be inserted in-line with the message data to indicate to the end user where the beginning of the red text starts. A second situational-specific tag 505 may be inserted in-line with the email data to indicate where the red text of the email ends, thus providing visual assistance to the end user to view the email message and understand which parts of the email may written in red text despite the end user being unable to visually the difference between the red text from the surrounding text of the email message.

Referring to the drawings, FIG. 6a-6b describes a second example of medical services 117 analyzing streaming inputs entering the personal medical channel 227 and tagging the data of the streaming inputs with situational specific tags that provide additional context to the streaming inputs of data, allowing the end user suffering from a visual impairment to otherwise understand the context of the data being received on the end user's device 101. As depicted in the example of FIG. 6a, an end user 601 operating an end user device 101 engages in a text messaging conversation being transmitted between a second user via the personal medical channel 227 of the communications network 150. In FIG. 6a, a description of a vehicle is provided to the end user 601 via text messaging data, while an image of the vehicle is provided to the end user in FIG. 6b. Embodiments of the medical services 117 may analyze the text messaging data and image data depicting the vehicle within the context of the conversation topic between the end user 601 and the second user by monitoring the communication data transmitted using the personal medical channel 227.

Analyzing the text message descriptions provided in FIG. 6a along with the image transmitted over the communication network 150, as shown in FIG. 6b, the medical services 117 may be able to infer which car being described to the end user is the second user's vehicle within the image. The identified vehicle based on the context of the transmitted messages and images may be tagged with situational-specific tag 603 as shown in FIG. 6b. The situational-specific tag 603 may be inserted in-line with the data being transmitted over the communication network 150 and outputted to the end user device 101 alongside the image data depicting the vehicle. As shown in FIG. 6b, the situational-specific tag 603 is overlaid onto the image displayed by the end user device 101, pointing to the second user's vehicle and indicating a description of the vehicle in this example (i.e. "Driver's blue sedan").

In some embodiments, additional data may be collected from one or more additional data sources 119 to provide more context or environmental information. The additional data can be analyzed by the medical services to further understand the situationally specific data being presented to the end user. For example, the text message presented in FIG. 6a indicates a location of the second user's vehicle as being outside the end user's 601 building. Embodiments of the medical services 117 may receive or retrieve additional inputs from additional data sources 119, such as location services 241, sensor readings, IoT device communications, data and metadata from an end user device 101 or another client device on the communication network, including video streaming data from one or more client devices. For example, referring back to FIG. 6a-6b, additional context to pinpoint the location and position of the vehicle described, relative to the location of the end user device receiving the image of the vehicle being described. For instance, additional data sources 119 could be accessed to pinpoint the vehicle's location, such as comparing GPS location of the end user 601 and/or the second user via location services 241, readings from one or more sensor devices within the vehicle may measure speed, travel distance, direction, etc. while camera systems or other IoT devices of the vehicle may capture images of the vehicle's surrounding environment which can be further identified by the medical services 117 and cross-checked with the text messaging data and/or vehicle image to ensure the medical services 117 accurately labels the correct vehicle in image sent to the end user 601.

Referring to the drawings, FIGS. 6c-6d provide an example of an embodiment of vision assistance that may be outputted by the medical services 117 to an end user device 101. In the example of FIG. 6c-6d, IoT devices, such as a smart display, may utilize augmented reality, vision recognition and other imaging techniques to provide descriptive overlays comprising situation-specific tags 603 onto the smart display. The overlays may be positioned onto or adjacent to physical objects viewed through the display 818 based on where the end user's gaze is directed. The one or more physical objects within the field of vision of the smart display or other types of human-readable displays 818 may be tagged with a situational-specific tag as shown in FIG. 6d. In the example of FIG. 6c-6d, can be a continuation of the example described above for FIG. 6a-6b. Continuing from the FIG. 6a-6b example, an end user equipped with a smart display or another computing device for viewing one or more physical objects, may proceed to change locations in order to find the second user's vehicle as described by the messaging data in FIG. 6a and/or the image provided in FIG. 6b. As the end user views the second user's vehicle through the smart device or other augmented reality capable device, the situation-specific tag 603 appears on the display 818 as shown in FIG. 6d, providing a tagged description and/or indicator identifying the vehicle so the end user knows which vehicle matches the one identified within the context of the conversation between the end user and the second user, based on vehicle description, image of the vehicle and/or additional streaming inputs entering through the personal medical channel from one or more additional data sources 119.

In some embodiments, the service provider of the medical services 117 may customize the medical services 117 based on the user, the user's preferred preferences and the type of condition the user may be suffering from. Customized user information may be stored and maintained as part of a medical service user profile 229. Embodiments of the medical service user profile 229 may allow for the personal medical channel 227 to be customized upon the authentication of the end user, regardless of the end user device 101 being employed by the end user to access the medical services 117. For example, the medical service user profile 229 may include a configuration describing which colors an end user may not be able to identify. In some embodiments one or more features of the medical services 117 may be selected or applied based on which end user device 101 is being used to access the communication network 150. For example, an end user connecting to the communication network with a smart display or mobile device capable of utilizing augmented reality features to tag objects within an environment may be enabled by the medical services 117 when an augmented reality enabled device is connected. Alternatively, when a non-augmented reality device is connected as the end user device 101, the augmented reality outputs may be disabled in favor of in-line tagging displayed images, video, text, etc.

Figure 3:
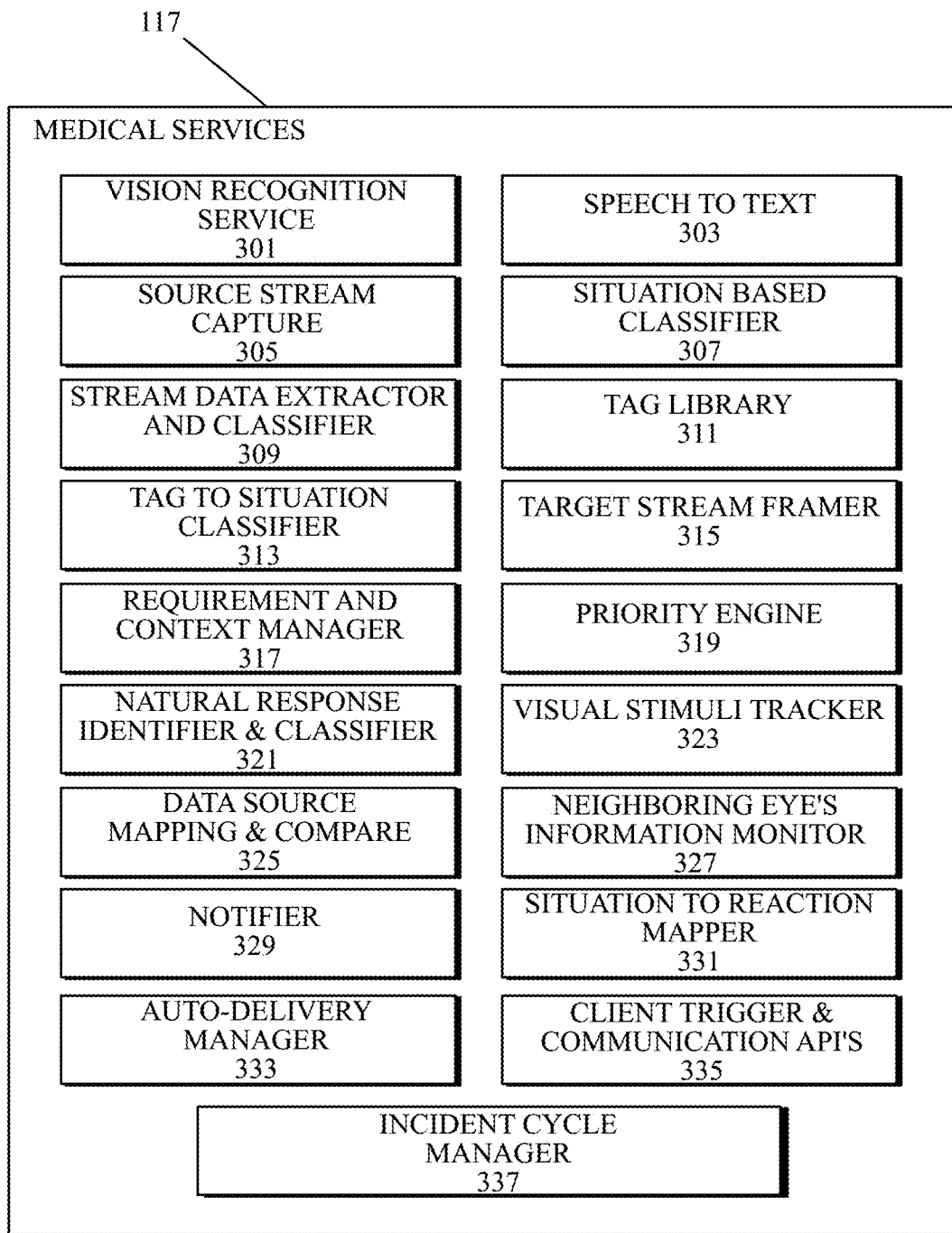
FIG. 3 depicts a functional block diagram describing components of an embodiment of a medical service.

Referring to the drawings, FIG. 3 depicts a block diagram of an embodiment of the medical services 117 that may provide visual assistance to an end user device 101 via the end user's personal medical channel 227. As depicted in FIG. 3, the medical services 117 may comprise a plurality of programs, modules, and components that may perform one or more functions or tasks associated with providing visual assistance to the end user via the end user device 101. The programs, modules and components of the medical services 117 may include a vision recognition service 301, speech to text 303, source stream capture 305, situation based classifier 307, stream data extractor and classifier 309, tag library 311, tag to situation classifier 313, target stream framer 315, requirement and context manager 317, priority engine 319, natural response identifier and classifier 321, visual stimuli tracker 323, Data source mapping & compare 325, "neighboring eyes" information monitor 327, notifier 329, situation to reaction mapper 331, auto-delivery manager 333, client trigger and communication API 335 and/or incident cycle manager 337.

Embodiments of the vision recognition service 301 may perform the tasks or functions of the medical services 117 associated with detection, recognition, amd identification of objects within the streaming inputs of data into the personal medical channel 227. For example, identifying objects within an image or video sequence. Embodiments of the vision recognition service 301 may employ computer vision techniques that may identify objects based on appearance of the objects being viewed. Appearance-based techniques such as edge matching, greyscale matching, gradient matching, histograms, and divide-and-conquer searching may be employed in some embodiments. Other techniques that may be employed by the vision recognition service 301 may identify objects of the streaming inputs into the personal medical channel 227 using feature-based techniques that may employ methods of feature extraction to identify objects. For example, employing techniques such as interpretation trees, pose consistency, pose clustering, invariance, geometric hashing, scale-invariant feature transform. Additional techniques of vision recognition may include 3D construction, 3D single-object recognition, artificial neural networks and convolution neural networks, reflectance, template matching, and texture matching.

Embodiments of the speech to text 303 module provides speech to text services on one or more streaming inputs passing through the personal medical channel 227. The speech to text 303 module translates speech inputs, such as voice recordings, voice data and audio into a textual format, for further analysis and processing for situational context by the medical services 117. In some embodiments of the speech to text 303 module, natural language processing (NLP) may be used to extract one or more features from the speech inputs. Extracted features of the speech inputs can be further processed using one or more machine learning models or algorithms to improve the accuracy of the text conversion and identification of situational context from the speech inputs being provided to the personal medical channel 227. For example, a phone conversation between the end user and a second user may include voice data describing a landmark, image, video or other visual content being conveyed to the end user. Using the speech to text 303 module, medical services 117 can convert the voice data to text and analyze the text to understand the context of the conversation and apply the insights from the voice conversation to additional communications being sent to the end user device 101, such as transmission images or videos that coincide with the topics of the voice conversation, when the medical services 117 is applying situational-specific tags as output to the data received by the end user device 101.

In some embodiments of the medical services 117, the medical services 117 may comprise a source stream capture 305 module. Embodiments of the source stream capture 305 module may perform the task or function of the medical services 117 directed toward capturing and storing the input signal of the streaming inputs passing through the personal medical channel 227. The source stream capture 305 module may organize and store the captured input signals of the streaming inputs in one or more data structures which may be allocated as virtual network resources 225. Embodiments of the source stream capture 305 module may include a serial data controller, which may be responsible for performing signal capture and storage on the communications network 150.

Situation based classifier 307 may perform the tasks or functions of the medical services 117 associated with analyzing the streaming inputs passing through the personal medical channel 227 and applies one or more data classification techniques to the input data streaming into the personal medical channel in order to output one or more labels or class of labels onto the streaming inputs describing the situational context of the streaming inputs. Embodiments of situation based classifier 307 may output simple labels that describe the situational context of the input data, for example, by classifying the situation as requiring color tagging or not. In some embodiments, situational classification may be more complex. For example, situational classification can include a generation of outputs that label the context of each set of data that comprises the streaming inputs, such as the classification of people, locations, environments, structures, objects, etc., that may be discussed or associated with the data of the streaming inputs.

In some embodiments of the medical services 117, streaming inputs of data passing through the personal medical channel 227 may be classified inline. A stream data extractor and classifier 309 may perform the inline classification functions on the streaming inputs of data, outputting labels classifying the types and kinds of data being streamed through the personal medical channel 227 as well as descriptions of the content of the data. Embodiments of the stream data extractor and classifier 309 may further perform the functions of feature extraction on the classified data to further describe relevant information associated with each set of data being streamed. For example, streaming inputs passing through the personal medical channel 227 can include images and video streams which may undergo feature extraction to identify the content of the images and video streams, including identification of one or more objects that may be present within image or video. In some embodiments, a separate natural response identifier and classifier 321 may be utilized for classifying output from the speech to text 303 module. For example, processing outputs from a natural language processor using the natural response identifier and classifier 321 to apply one or more classifications to the text of the output.

Embodiments of the tag library 311 may include a collection of tags created for identifying and describing various situations, people, places, objects, locations, colors, etc., that may be experienced or interacted with by the end user during communications over the communication network 150. Embodiments of the tag library 311 may be a self-contained collection of tags in some instances, or the tag library 311 may be connected to a service, such as the tag database 243 which may continuously or periodically update the tags maintained by the tag library 311. In some embodiments, medical services 117 may generate and store new tags to the tag library and/or provide updates to the tag database 243. In some embodiments, a situation to reaction mapper 331 may be employed by the medical services to perform the task or function of naturally generating the situational-specific tags based on the experiences, interactions, and communications of the user monitored and analyzed by the communication network 150. Embodiments of the situation to reaction mapper 331 may map the situations identified by the medical services 117 to existing tags of the tag library 311 and/or tag database 243 and where a corresponding tag may not exist or be appropriate to describe the situation identified, the situation to reaction mapper 331 may create and store a new tag appropriate for the situation and/or send an instruction to the tag library 311 and/or tag database 243 to perform the action of creating a new tag corresponding to the identified situation.

Embodiments of the tag to situation classifier 313 may operate in conjunction with the tag library 311. The tag to situation classifier 313 may perform the function or task associated with identifying appropriate tags to apply to the sets of data captured by the source stream capture 305 and situationally classified by the situation based classifier 307. Embodiments of the tag to situation classifier 313 may use the labels provided by the situation based classifier 307 and map the situational labels to tags within the tag library 311 in order to select the appropriate tag for the particular situation. Tags selected as appropriate based on the determination by the tag to situation classifier 313, may be applied to the data of the streaming inputs by embedding the selected tag in-line with the data of the streaming inputs. The target stream framer 315 may perform the embedding functions and embed the selected tags within the streaming inputs of data. Embodiments of the target stream framer 315 may create the output stream comprising both the streaming input data received by the medical services 117 and the situational-specific tags selected for application to the input data. The target stream framer 315 can select the destination for delivery of the output stream and auto-delivery manager 333 may autonomously deliver the output stream comprising the tagged data from the medical services 117 to the end user device 101 or other destination designated by the target stream framer 315 to receive the tagged data.

Embodiments of the medical services 117 may further comprise a requirement and context manager 317. Embodiments of the requirement and context manager 317 may perform the function or tasks associated with context awareness, context identification and/or context change detection. The requirement and context manager 317 (hereinafter "context manager 317") may gather information about the environment surrounding end user, secondary users, end user device 101 or one or more client devices that may be interacting with the end user through communications network 150 and adapt the operations of the medical services 117 in accordance with the context of the environment and changes thereto. The contextual information gathered about the surrounding environment of the users and/or user devices may include any information relating to the persons, devices, applications and services, location, time, device identification, user identity, user role, privilege level, activity, task, process and nearby devices or users.

One or more data sources 119 may provide contextual information and context changes to the context manager 317. Data sources 119 that may be collecting data and providing context information to the context manager 317 may include (but is not limited to) camera systems 507, microphones, GPS satellite receivers, sensor devices, IoT devices, mobile communication devices and other computer systems 800. Additional contextual information from data sources may include personality insights about individual end users, which may be stored or provided as a service via the analytics database 239, information stored by one or more user profiles maintained by one or more applications and services, historical data describing the end user's habits, activities, browsing history, social media history, etc. In some embodiments of the medical services 117, a data source mapping & compare 325 module may perform the functions and/or tasks associated with mapping historical data and other informational insights derived from the one or more data sources 119 to one or more databases, storage devices or repositories wherein the historical data collected may be referenced against and compared to a current context being analyzed in order to help identify environmental contextual information. In some embodiments of the medical services 117, a priority engine 319 may be used map the prioritization of environmental context and changes in context. Based on the prioritization of changes in the environmental context, the tag to situation classifier 313 may prioritize the application of tags directed toward a particular situation and/or context over other tags that may be selected from the tag library 311.

Embodiments of the medical services 117 may include a visual stimuli tracker 323 module. Embodiments of the of the visual stimuli tracker 323 may perform functions and tasks directed toward tracking the gaze of the end user, identifying the position currently being viewed by the end user and collecting information about one or more visual stimulus that may be observed by the end user and/or a camera system 507 that may be collecting information about the visual stimuli being viewed by the end user. Information about the location and direction of the end user's gaze may be useful for determining the positioning and location of tag onto the output stream such that the output location of the situational-specific tags do not interfere with other data that may be in the line of sight of the end user's gaze. Therefore, limiting interference that may be caused by the insertion of the situational specific tags with other data being viewed by the end user.

Furthermore, embodiments of the gaze detection and stimulus collection functions of the visual stimuli tracker 323 may be applied in situations where augmented reality features comprising real-time inclusion of situational-specific tags, may be provided to the end user device 101. Medical services 117 may utilize the information collected and tracked by visual stimuli tracker 323 to determine when tagged objects of the streaming inputs are within the gaze of the end user in order to properly output the tag data in the proper position and alignment with the physical object being tagged on the augmented reality interface. The visual stimuli tracker 323 may indicate that the end user is currently viewing one or more objects that have been tagged by the medical services 117 and signal to the target stream framer 315 that output of the tag onto the appropriate physical object currently being viewed is the appropriate time to output the tag and/or descriptions of the object onto the end user device 101 display 818.

In some embodiments, the medical services 117 may comprise a neighboring eye's information monitor 327 to synchronize object detection and improve accuracy of object detection by employing the use of surrounding devices of the communication network 150 to monitor end user device 101 position and relationships to objects identified as part of the streaming inputs as well as the accuracy of gaze detection by the visual stimuli tracker 323. For example, the medical services 117 may improve object detection and accuracy by leveraging nearby camera systems 507, sensor devices and/or IoT devices to further monitor the actions of the end user, by providing multiple sources and angles for tracking the end user rather than just data collection at a single point. For instance, the environment surrounding the end user and gaze of the end user may be tracked by a plurality of camera systems 507 positioned nearby, each recording from a different angle, to provide additional data about surrounding objects, object positions and eye positioning of the end user. For example, employing vision recognition services 301 to detect objects via the camera system 507 connected to the end user device 101 as well as additional vision recognition of objects using one or more cameras, sensors or IoT devices recording the same objects via additional devices connected to the communication network 150 that share the collected data with the medical services 117.

Embodiments of the medical services 117 may include notifier 329. The notifier 329 may perform the tasks or functions related to notification engine operations, including providing error notifications to the end user device 101. Embodiments of the notifier 329 may perform functions such as determining notification recipients, create or specify notification text, initiate notification delivery to the intended recipients and log the notification details to a notification log file. Moreover, in some embodiments of the medical services 117, an incident cycle manager 337 may be employed by the medical services 117 to track incidents and restore disrupted or failed services in order to deliver promised performance. Embodiments of the incident cycle manager 337 can restore the medical services 117 to normal operation and the incident cycle manager 337 can identify the conditions that may have caused the disruption to the services and may automatically respond if similar conditions occur again, in order to prevent disruptions to the service from repeatedly occurring due to the same conditions that triggered the disruption previously. Embodiments of the incident cycle manager 337 may recognize that incidents may match with existing problems (without a known root cause) or known errors (with a known root cause) under the control of the incident cycle manager 337 and registered in a known-error database. When an incident is not the result of a problem or known error, it may be either an isolated or individual occurrence or may (once the initial issue has been addressed) require the incident cycle manager 337 to become involved, possibly resulting in a new incident record being raised and registered for future reference.

Method for Providing Real-Time Vision Assistance

Figure 7:
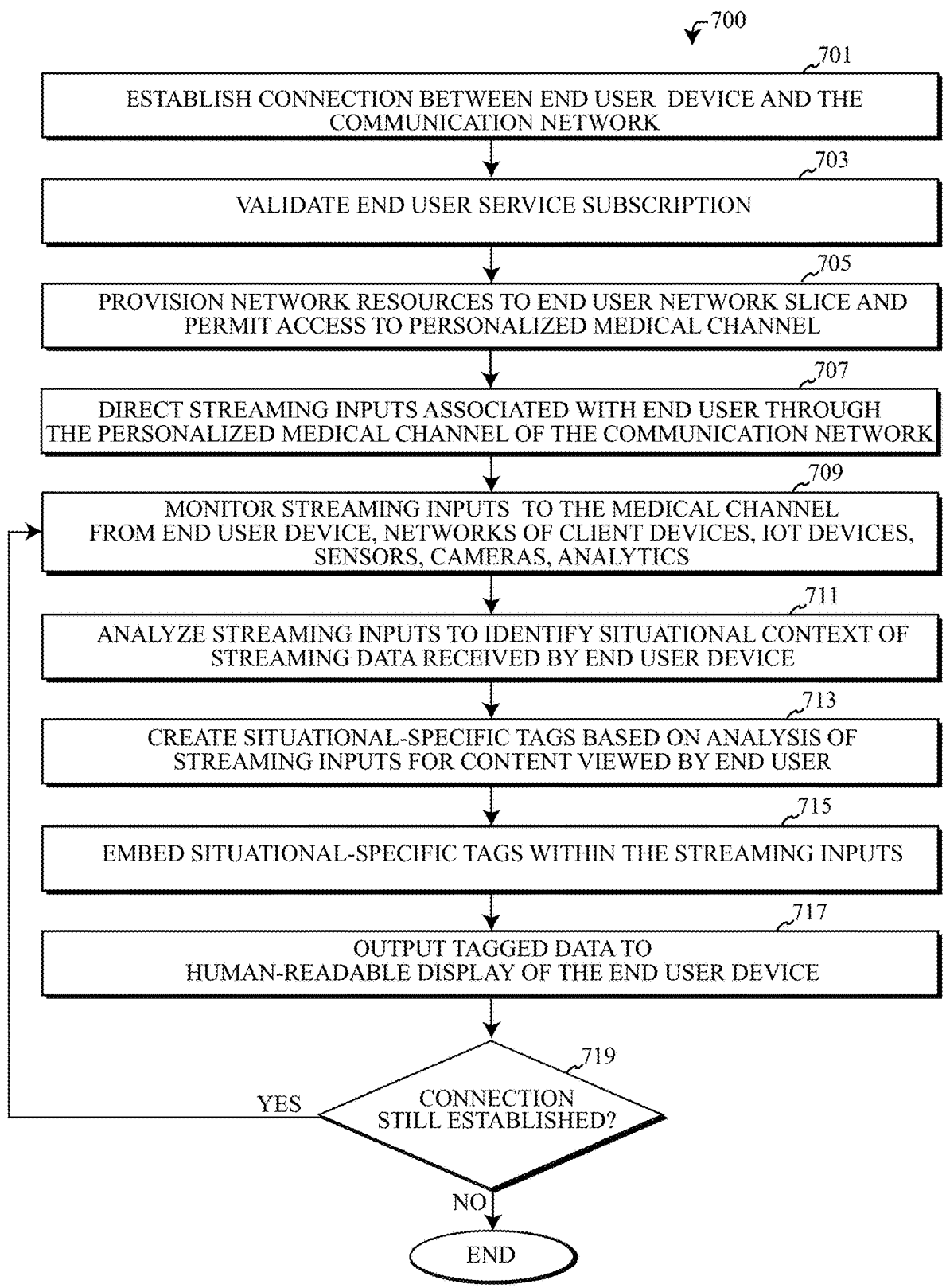
FIG. 7 depicts an embodiment of an algorithm implementing computerized method for providing real-time vision assistance by a communication network to an end-user device to assist a user suffering from visual impairments.

The drawings of FIG. 7 represent an embodiment of an algorithm 700 for creating and orchestrating medical services 117 using a dedicated personal medical channel 227 of a communication network 150 to augment incoming data with situationally relevant tags to assist users suffering from visual impairments, as described by FIGS. 1-6*d* using one or more computer systems defined generically by computer system 800 of FIG. 8 below and more specifically by the embodiments of specialized computer systems depicted in FIGS. 1-6*d* and as described herein. A person skilled in the art should recognize that the steps of the method described in FIG. 7 may be performed in a different order than presented. The algorithm 700 may not necessarily require all the steps described herein to be performed. Rather, some embodiments of algorithm 700 may alter the methods by performing a subset of steps using one or more of the steps discussed below.

Embodiments of the algorithm 700 may begin at step 701. In step 701, an end user device 101 may establish a connection with a communications network 150. The connection can be established using known device connection protocols for connecting an end user device 101 to a communications network 150. In step 703, the communications network 150 may receive a request from the end user device 101 to provision the end user device 101 a personal medical channel 227 on the communications network 150. Embodiments of the communications network 150 may validate the end user device 101 request to receive access to the personal medical channel 227. For example, if the personal medical channel 227 is a resource purchased by an end user on a subscription basis, the communications network 150 can validate the end user's subscription as valid and authorize the end user device 101 access to the personal medical channel 227.

In step 705, embodiments of the communications network 150 may provision network resources to the creation of the personal medical channel 227 and permit access of the end user device 101 to the personalized medical channel. Embodiments of step 705 may be implemented by the logical channel manager 403 of the end to end service management and orchestration 201 layer of the communication network 150. The logical channel manager 403 controls the channel assignment logic 405 which may create the personal medical channel 227 as a new network slice of the communication network 150 by provisioning virtual network resources 225 to the network slice dedicated to hosting the personal medical channel 227. Virtual network resources 225 are provisioned from physical infrastructure and resources 209 which have undergone virtualization 205 and may be controlled and apportioned by the end to end service management and orchestration 201 based on the need of the new network slice being created. The information tunneling manager 413 authenticates the end user device 101 connecting to the personal medical channel and enables the communication network 150 to begin capturing data sent over the communications network 150 via the personal medical channel 227, to and from the end user device 101. Furthermore, embodiments of the logical channel manager 403 may further control and apply certain channel characteristics to the personal medical channel 227. Various characteristics may be implemented by the device discovery service and channel level QCI 415 module of the logical channel manager 403, including the characteristics of the personal medical channel 227 that may implemented to maintain the level of service by the personal medical channel in alignment with the agreed upon service levels guaranteed by a service level agreement between the end user and the communications network 150 providing the medical services 117 to the end user.

In step 707 of the algorithm 700, embodiments of the end to end service management and orchestration 201 may direct streaming inputs associated with the end user device 101 to the personalized medical channel 227 of the communications network 150, established in step 705. The logical channel packet collection 407 module of the logical channel manager 403 may be responsible for inline packet capture at the individual channel level, capturing the packets of data being routed to the personal medical channel 227 by the user device identifier and data collection 409 module to the packets' output destination. For example, data packets sent to the end user device 101 are identified and outputted to the end user device 101 and/or data packets sent from the end user device 101 are routed through the personal medical channel 227 and outputted to a destination computer system or client device of the communication network 150.

In step 709 of algorithm 700, the end to end service management and orchestration 201 layer continuously monitors the streaming inputs being through the personal medical channel 227 of the communications network 150. In some embodiments, the monitoring step may be performed by one or more monitoring tools of the end to end service management and orchestration 201 layer. In the exemplary embodiment of the communication network 150, the medical service monitor 411 performs the continuous monitor functions of the streaming inputs being captured by the logical channel packet collection 407. The medical service monitor 411 may perform one or more monitoring functions by deploying the medical services 117 of the application and services 203 layer of the communication network 150 and access one or more components or features of the medical services 117.

During step 709, as part of the medical service monitor 411, one or more features of the medical services 117 can be deployed during the monitoring of the streaming input. Embodiments of the medical services 117 can deploy the source stream capture 305 module. Embodiments of the source stream capture 305 module may be a serial data controller capturing the streaming input data passing through the personal medical channel 227. The captured streaming input data obtained by the source stream capture 305 module may be stored by one or more data structures provisioned to the personal medical channel 227 as virtual network resources 225. Sources of the streaming data being monitored may vary from embodiment to embodiment. In some embodiments, the data sources 119 that may be part of the streaming data can include data being transmitted from other computer systems and services connected to the communication network 150. For example, streaming data of the streaming input being monitored can be from other applications or services running in the application service 203 layer of the communication network 150, such as location services 241, weather applications, analytics databases 239 comprising historically collected user data, browser data or other application data. In some embodiments, the data being streamed to the personal medical channel 227 may be transmitted from one or more devices that have been instanced to additional network slices of the communication network 150. For example, the streaming data may be traveling between the end user device 101 and an IoT network slice 231, client device(s) instanced to a client device network slice 233, a sensor device network comprising one or more sensor devices which may be recording measurements, a video streaming network slice 237, audio streaming network slice, or any other type of instance that may be provisioned by the end to end service management and orchestration 201 on the communications network 150.

During step 709 of algorithm 700, steaming inputs may be monitored using vision recognition service 301 and speech to text 303 modules to understand the content of the streaming inputs prior to analysis and classification of the situational context corresponding to the streaming input. For example, the vision recognition service 301 can detect the presence of objects in the data stream, and in some embodiments can employ object recognition software to identify the type of object being captured as part of the data stream. Likewise, speech to text 303 module can translate recorded speech inputs of the data stream into a textual format using natural language processing and other speech to text algorithms. The output from the speech to text 303 module and the vision recognition service 301, can be stored by the source stream capture 305 module for further analysis and processing during subsequent steps of the algorithm 700.

In step 711 of the algorithm 700, the streaming inputs being monitored by the medical service monitor 411 are analyzed using one or more functions of the medical services 117, in order to identify situational context of the streaming data being passed through the personal medical channel 227. During the analysis of the streaming inputs, the situation based classifier 307 may employ one or more data classification techniques to classify the streaming data captured and stored by the source stream capture 305 module, including data recognized by the vision recognition service 301. In some embodiments text outputs converted using natural language processing of the speech to text 303 module maybe classified as well. Embodiments of the end to end service management and orchestration 201 may deploy a natural response identifier and classifier 321 to further provide classification functions for the speech converted to text using natural language processing of the speech to text 303 module.

In some embodiments of algorithm 700, the streaming inputs of the data stream being transmitted between the end user device and one or more additional devices or systems, may be classified inline while being streamed. The classification of the data may be performed by the stream data extractor and classifier 309. During inline classification of the streaming data, stream data extractor and classifier 309 may extract one or more features of the data. Extracted features may be expected to contain relevant information from the streaming input data of the data stream. Accordingly, the extracted features identified by the stream data extractor and classifier 309 can be further analyzed for situational context by the situation based classifier 307.

Based on the analysis of the streaming inputs as described in step 711, embodiments of the algorithm 700 may, in step 713, create situational-specific tags using the situational classifications, object identifications and/or data classifications as determined by the vision recognition service 301, situation based classifier 307 and stream data extractor and classifier 309. The tag to situation classifier 313 identifies suitable tags within the tag library 311 that correspond to the situational classifications of the streaming inputs of the data stream analyzed in step 711. Using the appropriate tags for the situational context as identified by the tag to situation classifier 313, the target stream framer 315 can create the output stream comprising one or more embedded tags attached to one or more objects, or other portions of data within the data stream. The situational-specific tags may be embedded inline within the output stream to the corresponding stream data. In step 717, the output stream created by the target stream framer 315, comprising the situational-specific tags may be outputted through the personal medical channel 227 to the end user device 101. The output stream comprising the situational-specific tags may be displayed as part of an API or other user interface being displayed by a human-readable display 818.

In step 719 of algorithm 700, a determination may be made by the communications network 150 whether or not a connection between the end user device 101 and the communications network 150 is still established. If the end user device 101 is no longer connected to the communications network, the algorithm 700 may be considered complete and end the current instance. Conversely, if the end user device 101 is still connected to the communications network 150, the communications network 150 and the medical services 117 may continue to operate. The algorithm 700 may proceed back to step 709, wherein the algorithm 700 may continue to monitor the streaming inputs of the communications network 150 being routed through the personal medical channel 227 of owned, leased, subscribed or otherwise associated with the end user.

Computer System

FIG. 8 illustrates a block diagram of internal and external components depicting an embodiment of a computer system 800, which may be representative of the one or more computer systems depicted in the computing environment 100 as shown in FIGS. 1-6d, in accordance with the embodiments of the present disclosure. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, IOT devices, sensor devices and distributed cloud computing environments that include any of the above systems or devices.

Computer system 800 may include communications fabric 802, which provides for communications between one or more processors 803, memory 805, persistent storage 806, communications unit 811, and one or more input/output (I/O) interfaces 815. Communications fabric 802 can be implemented with any architecture designed for passing data and/or controlling information between processors 803 (such as microprocessors, communications and network processors, etc.), memory 805, external devices 817, and any other hardware components within a system. For example, communications fabric 802 can be implemented with one or more buses.

Memory 805 and persistent storage 806 may be computer-readable storage media. Embodiments of memory 805 may include random access memory (RAM) and cache 807 memory. In general, memory 805 can include any suitable volatile or non-volatile computer-readable storage media. Software applications and services 203, such as medical services 117 may be stored in persistent storage 806 for execution and/or access by one or more of the respective processors 803 of the underlying infrastructure and resources 209 of the communication network 150.

Persistent storage 806 may include, for example, a plurality of magnetic hard disk drives. Alternatively, or in addition to magnetic hard disk drives, persistent storage 806 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 806 can also be removable. For example, a removable hard drive can be used for persistent storage 806. Other examples include optical and magnetic disks, thumb drives, and smart cards that are inserted into a drive for transfer onto another computer-readable storage medium that is also part of persistent storage 806.

Communications unit 811 provides for communications with other computer systems or devices via a network (e.g., communication network 150). In the exemplary embodiment, communications unit 811 may include network adapters or interfaces such as a TCP/IP adapter cards, wireless Wi-Fi interface cards, 3G, 4G, or 5G wireless interface cards or other wired or wireless communication links. The communication network 150 can comprise, for example, copper wires, optical fibers, wireless transmission, routers, firewalls, switches, gateway computers, edge servers and/or other infrastructure and resources 209 which may be part of the radio nodes 211, cloud nodes 213 and network nodes 215 which create the communication network 150. Software and data used to practice embodiments of the present invention can be downloaded to each of the computer systems operating in computing environment 100 or computer system 800 through communications unit 811 (e.g., via the Internet, a local area network or other wide area network). From communications unit 811, the software and data can be loaded onto persistent storage 806.

One or more I/O interfaces 815 may allow for input and output of data with other devices that may be connected to computer system 800. For example, I/O interface 815 can provide a connection to one or more external devices 817 such as one or more internet-of-things devices, recording devices such as an audio system, camera systems, one or more sensor device(s), input devices such as a keyboard, computer mouse, touch screen, virtual keyboard, touch pad, pointing device, or other human interface devices. External devices 817 can also include portable computer-readable storage media such as, for example, thumb drives, portable optical or magnetic disks, and memory cards. I/O interface 815 may connect to human-readable display 818. Human-readable display 818 provides a mechanism to display data to a user and can be, for example, a computer monitor or screen. Human-readable display 818 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
provisioning, by end to end service management and orchestration (E2E management) of a communication network, virtual network resources of the communication network to create a virtualized instance as a network slice on the communication network comprising a personal medical channel operating as a bidirectional data channel dedicated to facilitating communications of an end user device on the communication network;
monitoring, by the E2E management, data of a streaming input transmitted over the communication network through the personal medical channel, wherein said data is streaming to or from the end user device;
capturing, by the E2E management, the data of the streaming input being routed through the personal medical channel;
deploying, by E2E management, one or more applications or services of the communication network to:
analyze the data of the streaming input for situational context of content within the data and one or more objects forming the content;
classify the situational context of the data that comprises the streaming input;
create a situational-specific tag describing the one or more objects of the content based on classification of the situational context of the data of the streaming input;
embed the situational-specific tag describing the one or more objects, in-line with the data of the streaming input;
create an output stream comprising the data of the streaming input and the situational-specific tag describing the one or more objects, in-line with the data; and
outputting, by E2E management, the output stream to the end user device.

2. The computer-implemented method of claim 1, wherein the situational-specific tag embeds a description of a color of the one or more objects being displayed by the end user device.

3. The computer-implemented method of claim 1, further comprising:
displaying the one or more objects embedded with the situational-specific tags wherein the displaying step utilizes augmented reality to overlay the situational-specific tag on a human-readable display to coordinate a position of the situational-specific tag adjacent to a physical object being viewed through the human-readable display.

4. The computer-implemented method of claim 1, wherein analyzing the data of the streaming input for situational context of the content identifies situational context based on an analysis of recorded data by the end user device, wherein the recorded data is at least one of location data, environmental data, sensor data, end user's gaze, or video data.

5. The computer-implemented method of claim 1, wherein analyzing the data of the streaming input for situational context of the content further comprises:
identifying the one or more objects of the streaming input using object recognition software.

6. The computer-implemented method of claim 1, wherein the communication network is a 5G mobile communication network comprising a plurality of individual virtual networks dedicated to servicing tenants and customers using software defined networking or network function virtualization.

7. The computer-implemented method of claim 4, wherein the network slice further comprises a user profile and the end user device is a master client device of an ad-hoc network of devices, systems and sensors streaming data through the personal medical channel to an API wherein the devices, systems and sensors of the ad-hoc network are controlled by a single end user operating under the user profile.

8. A computer system comprising:
at least one processor; and
a computer-readable storage media coupled to the at least one processor, wherein the computer-readable storage media contains program instructions executing a computer-implemented method comprising the steps of:
provisioning, by end to end service management and orchestration (E2E management) of a communication network, virtual network resources of the communication network to create a personal medical channel operating as a bidirectional data channel dedicated to facilitating communications of an end user device on the communication network;
monitoring, by the E2E management, data of a streaming input transmitted over the communication network via the personal medical channel, wherein said data is streaming to or from the end user device;
capturing, by the E2E management, the data of the streaming input being routed through the personal medical channel;
deploying, by E2E management, one or more applications or services of the communication network to:
analyze the data of the streaming input for situational context of content within the data and one or more objects forming the content;
classify the situational context of the data that comprises the streaming input;
create a situational-specific tag describing the one or more objects of the content based on classification of the situational context of the data of the streaming input;
embed the situational-specific tag describing the one or more objects, in-line with the data of the streaming input;
create an output stream comprising the data of the streaming input and the situational-specific tag describing the one or more objects, in-line with the data; and
outputting, by E2E management, the output stream to the end user device.

9. The computer system of claim 8, wherein the situational-specific tag embeds a description of a color of the one or more objects being displayed by the end user device.

10. The computer system of claim 8, further comprising:
displaying the one or more objects embedded with the situational-specific tags, wherein the displaying step utilizes augmented reality to overlay the situational-specific tag on a human-readable display to coordinate a position of the situational-specific tag adjacent to a physical object being viewed through the human-readable display.

11. The computer system of claim 8, wherein analyzing the data of the streaming input for situational context of the content identifies situational context based on an analysis of recorded data by the end user device, wherein the recorded data by the end user device is at least one of location data, environmental data, sensor data, end user's gaze, or video data.

12. The computer system of claim 8, wherein analyzing the data of the streaming input for situational context of the content further comprises:
identifying the one or more objects of the streaming input using object recognition software.

13. The computer system of claim 8, wherein the communication network is a 5G mobile communication network comprising a plurality of individual virtual networks dedicated to servicing tenants and customers using software defined networking or network function virtualization.

14. The computer system of claim 11, wherein the network slice further comprises a user profile and the end user device is a master client device of an ad-hoc network of devices, systems and sensors streaming data through the personal medical channel to an API wherein the devices, systems and sensors of the ad-hoc network are controlled by a single end user operating under the user profile.

15. A computer program product comprising:
one or more computer-readable storage media having computer-readable program instructions stored on the one or more computer-readable storage media, said program instructions executes a computer-implemented method comprising the steps of:
provisioning, by end to end service management and orchestration (E2E management) of a communication network, virtual network resources of the communication network to create a personal medical channel operating as a bidirectional data channel dedicated to facilitating communications of an end user device on the communication network;
monitoring, by the E2E management, data of a streaming input transmitted over the communication network via the personal medical channel, wherein said data is streaming to or from the end user device;
capturing, by the E2E management, the data of the streaming input being routed through the personal medical channel;
deploying, by E2E management, one or more applications or services of the communication network to:
analyze the data of the streaming input for situational context of content within the data and one or more objects forming the content;
classify the situational context of the data that comprises the streaming input;
create a situational-specific tag describing the one or more objects of the content based on classification of the situational context of the data of the streaming input;
embed the situational-specific tag describing the one or more objects, in-line with the data of the streaming input;
create an output stream comprising the data of the streaming input and the situational-specific tag describing the one or more objects, in-line with the data; and
outputting, by E2E management, the output stream to the end user device.

16. The computer program product of claim 15, wherein the situational-specific tag embeds a description of a color of the one or more objects being displayed by the end user device.

17. The computer program product of claim 15, further comprising:
displaying the one or more objects embedded with the situational-specific tags, wherein the displaying step utilizes augmented reality to overlay the situational-specific tag on a human-readable display to coordinate a position of the situational-specific tag adjacent to a physical object being viewed through the human-readable display.

18. The computer program product of claim 15, wherein analyzing the data of the streaming input for situational context of the content identifies situational context based on an analysis of recorded data by the end user device, wherein the recorded data by the end user device is at least one of location data, environmental data, sensor data, end user's gaze, or video data.

19. The computer program product of claim 15, wherein the communication network is a 5G mobile communication network comprising a plurality of individual virtual networks dedicated to servicing tenants and customers using software defined networking or network function virtualization.

20. The computer program product of claim 18, wherein the network slice further comprises a user profile and the end user device is a master client device of an ad-hoc network of devices, systems and sensors streaming data through the personal medical channel to an API wherein the devices, systems and sensors of the ad-hoc network are controlled by a single end user operating under the user profile.

* * * * *